United States Patent
Tobaru et al.

(10) Patent No.: US 6,438,463 B1
(45) Date of Patent: Aug. 20, 2002

(54) PROCESS FOR DETERMINING LATERAL OVERTURNING OF VEHICLE, AND SYSTEM FOR DETECTING INCLINATION ANGLE OF VEHICLE BODY

(75) Inventors: Shigeo Tobaru; Hiroyuki Maeda; Osamu Takahata, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 34 days.

(21) Appl. No.: 09/656,396

(22) Filed: Sep. 6, 2000

(30) Foreign Application Priority Data

| Sep. 6, 1999 | (JP) | 11-251319 |
| Sep. 6, 1999 | (JP) | 11-251320 |
| Sep. 6, 1999 | (JP) | 11-251321 |
| Sep. 6, 1999 | (JP) | 11-251322 |
| Sep. 6, 1999 | (JP) | 11-251323 |

(51) Int. Cl.$^7$ .......... G05D 1/00; B60R 25/10; B60G 17/01
(52) U.S. Cl. .......... 701/1; 340/429; 280/5.507
(58) Field of Search .......... 701/1, 23–24, 701/38, 41, 45, 80, 71–76, 82, 124, 90–91, 110–111; 340/429, 438, 440–441, 465–467; 280/5.502, 5.506–5.509

(56) References Cited

U.S. PATENT DOCUMENTS

| 6,002,975 A | * | 12/1999 | Schiffmann et al. | 701/36 |
| 6,038,495 A | * | 3/2000 | Schiffmann | 701/1 |
| 6,104,284 A | * | 8/2000 | Otsuka | 340/440 |
| 6,170,594 B1 | * | 1/2001 | Gilbert | 180/282 |
| 6,185,489 B1 | * | 2/2001 | Strickler | 701/29 |

FOREIGN PATENT DOCUMENTS

JP 7164985 6/1995

* cited by examiner

Primary Examiner—William A. Cuchlinski, Jr.
Assistant Examiner—Thu Nguyen
(74) Attorney, Agent, or Firm—Carrier, Blackman & Associates, P.C.; Joseph P. Carrier; William D. Blackman

(57) ABSTRACT

A process for determining the lateral overturning of a vehicle, comprises the steps of: establishing a threshold value line on a two-dimensional map made using a rolling angle and a rolling angular speed of the vehicle as parameters; plotting a hysteresis line for an actual rolling angle and an actual rolling angular speed on the two-dimensional map; and determining that there is a possibility that the vehicle is overturning laterally or sideways when the hysteresis line traverses the threshold value line from a side nearer to an origin of the map to a side farther from the origin. The threshold value line is changed depending on at least one of a lateral acceleration of the vehicle, a lateral speed of the vehicle, a direction of change in steering angle of the vehicle, and a rolling angular acceleration of the vehicle.

13 Claims, 20 Drawing Sheets

FIG.1
| NAME | IMAGE | CLASSIFICATION |
|---|---|---|
| FLIP OVER | 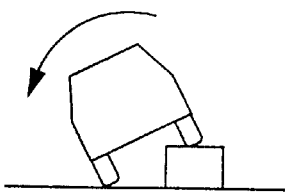 | SIMPLE ROLL |
| CLIMB OVER | 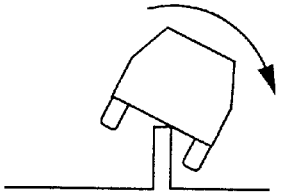 | SIMPLE ROLL |
| FALL OVER | 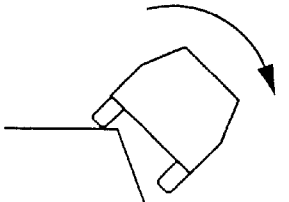 | SIMPLE ROLL |
| TRIP OVER | 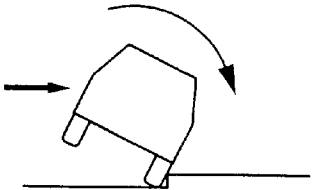 | SIMPLE ROLL + LATERAL SPEED |
| TURN OVER | 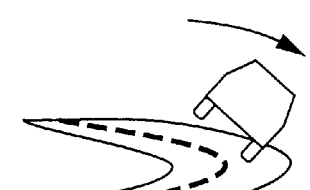 | DIVERGENCE |

PROCESS FOR DETERMINING LATERAL OVERTURNING OF VEHICLE, AND SYSTEM FOR DETECTING INCLINATION ANGLE OF VEHICLE BODY

BACKGROUND OF THE INVENTION

1. Field of the Invention

The present invention relates to a process for determining the presence or absence of a possibility that a vehicle is overturning laterally or sideways, based on a rolling angle and a rolling angular speed of the vehicle, and to a system for detecting an angle of inclination of the vehicle.

2. Description of the Related Art

A process for determining a possibility of lateral overturning of a vehicle is known from Japanese Patent Application Laid-open No. 7-164985. In this known process, a lateral overturning region is established on a two-dimensional map made using a rolling angle and a rolling angular speed as parameters in an area where the rolling angle and the rolling angular speed are large (an area spaced apart from an origin), and a lateral non-overturning region is established on the map in an area where the rolling angle and the rolling angular speed are small (an area including the origin). When a hysteresis line made by plotting actual rolling angles and actual rolling angular speeds, detected respectively by sensors, on the map enters the lateral overturning region from the lateral non-overturning region, it is determined that there is a possibility that the vehicle is overturning laterally or sideways, whereby an active roll bar is raised.

Principal parameters governing the presence or absence of a possibility that the vehicle is overturning laterally or sideways, are the rolling angle and the rolling angular speed, and in addition to these, there are parameters promoting or inhibiting the lateral overturning of the vehicle. For example, even if the rolling angle and the rolling angular speed of the vehicle are of the same level, the degree of the possibility of the lateral overturning is varied largely depending on a lateral acceleration of the vehicle. More specifically, if a lateral acceleration is generated in a direction of inclination of the vehicle, the lateral overturning of the vehicle is promoted. And if a lateral acceleration is generated opposite to the direction of inclination of the vehicle, the lateral overturning of the vehicle is inhibited. In addition, even if the rolling angle and the rolling angular speed of the vehicle are of the same level, the degree of the possibility of the lateral overturning is varied largely depending on a lateral slipping of the vehicle. More specifically, when the vehicle has been slipped laterally in a direction of rolling of the vehicle, whereby a tire has collided against an obstacle such as a curb, a large rolling moment about the curb is generated to promote the lateral overturning of the vehicle.

When a steering wheel is operated leftwards, the vehicle is inclined rightwards. When the steering wheel is operated rightwards, the vehicle is inclined leftwards. Therefore, when a lateral lane change is conducted continuously, or when the vehicle travels through an S-shaped road, the vehicle is inclined alternately leftwards and rightwards. When the frequency of the operation of the steering wheel is closer to the frequency of an inherent vibration of a suspension provided on the vehicle, there is a possibility that the rolling angle of the vehicle may be liable to be diverged due to a resonance, resulting in the lateral overturning.

In addition, even if the rolling angle and the rolling angular speed of the vehicle are of the same level, the degree of the possibility of the lateral overturning is varied largely depending on a steering angle of the vehicle. More specifically, when the steering wheel is operated leftwards, the vehicle is rolled rightwards. When the steering wheel is operated rightwards, the vehicle is rolled leftwards. Therefore, when the steering wheel is operated leftwards in a state in which the vehicle has been rolled rightwards, the rightward overturning of the vehicle is promoted. When the steering wheel is operated rightwards in a state in which the vehicle has been rolled leftwards, the leftward overturning of the vehicle is promoted.

Further, even if the rolling angle and the rolling angular speed of the vehicle are of the same level, the degree of the possibility of the lateral overturning is varied largely depending on a rolling angular acceleration of the vehicle. More specifically, when a rolling angular speed has been generated in a direction to increase the absolute value of a rolling angle of the vehicle, the lateral overturning of the vehicle is promoted if a rolling angular acceleration is generated in a direction to increase the absolute value of the rolling angular speed. On the other hand, if a rolling angular acceleration is generated in a direction to decrease the absolute value of the rolling angular speed, the lateral overturning of the vehicle is inhibited.

In the process described in Japanese Patent Application Laid-open No. 7-164985, a rolling angle $\theta$ of the vehicle is detected using two sensors. The first sensor is a sensor for detecting an inclination angle with respect to the direction of gravity force, and detects an initial value $\theta_0$ of a rolling angle of the vehicle based on a component of a gravitational acceleration in a lateral direction of a vehicle body and a component of the gravitational acceleration in a vertical direction of the vehicle body when an ignition switch is turned ON. The second sensor calculates an amount of change in rolling angle according to $\int \omega dt$ by time-integrating a rolling angular speed $\omega$ of the vehicle. The rolling angle $\theta$ of the vehicle is given as a sum of outputs from the two sensors according to $\theta = \theta_0 + \int \omega dt$.

It is surely possible to detect the rolling angle $\theta$ of the vehicle, even if using the first sensor alone. However, a lateral acceleration generated with the turning movement of the vehicle and a vertical acceleration generated due to unevenness of a road surface cannot be recognized as components of the gravitational acceleration in lateral and vertical directions of the vehicle body, respectively. For this reason, there is a possibility that a large error may be generated in the detection of a rolling angle $\theta$ during traveling of the vehicle. Moreover, there is a problem that a rolling angle $\theta$ cannot be detected during free dropping of the vehicle.

The second sensor detects an amount of change in rolling angle $\theta$ by time-integrating a rolling angular speed $\omega$ and hence, it is necessary to use another sensor for detecting an initial value $\theta_0$ of rolling angle $\theta$ in combination with the second sensor, as described in Japanese Patent Application Laid-open No. 7-164985. Moreover, the rolling angular speed sensor suffers from the following problem. It is difficult to avoid the generation of a drift, and even in a state in which the rolling angular speed $\omega$ is 0, the output does not necessarily assume 0. For this reason, an error is liable to be generated in the amount of change in rolling angle $\theta$, which is an integration value of such output.

SUMMARY OF THE INVENTION

Accordingly, it is a first object of the present invention to ensure that, when it is determined whether there is a possibility that a vehicle is overturning laterally or sideways, based on a rolling angle and a rolling angular speed of the vehicle, the accuracy of the determination is further enhanced.

It is a second object of the present invention to provide an inclination angle detecting system capable of accurately detecting an angle of inclination of a vehicle in various situations.

To achieve the above first object, according to a first aspect and feature of the present invention, there is provided a process for determining the lateral overturning of a vehicle, comprising the steps of: establishing a threshold value line on a two-dimensional map made using a rolling angle and a rolling angular speed of the vehicle as parameters, plotting a hysteresis line for an actual rolling angle and an actual rolling angular speed on the two-dimensional map, and determining that-there is a possibility that the vehicle is overturning laterally or sideways when the hysteresis line traverses the threshold value line from a side nearer to an origin of the map to a side farther from the origin, the threshold value line being changed depending on a lateral acceleration of the vehicle.

With the above process, the threshold value line established on the two-dimensional map made with the rolling angle and the rolling angular speed of the vehicle used as parameters is changed depending on the lateral acceleration of the vehicle. Therefore, it is possible to compensate for a variation in possibility of lateral overturning of the vehicle depending on the lateral acceleration of the vehicle to achieve a further accurate determination.

To achieve the first object, according to a second aspect and feature of the present invention, there is provided a process for determining the lateral overturning of a vehicle, comprising the steps of: establishing a threshold value line on a two-dimensional map made using a rolling angle and a rolling angular speed of the vehicle as parameters, plotting a hysteresis line for an actual rolling angle and an actual rolling angular speed on the two-dimensional map, and determining that there is a possibility that the vehicle is overturning laterally or sideways when the hysteresis line traverses the threshold value line from a side nearer to an origin of the map to a side farther from the origin, the threshold value line being changed depending on a lateral speed of the vehicle.

With the above process, the threshold value line established on the two-dimensional map made with the rolling angle and the rolling angular speed of the vehicle used as parameters is changed depending on the lateral speed of the vehicle. Therefore, it is possible to compensate for a variation in the possibility of lateral overturning of the vehicle depending on the lateral speed of the vehicle to achieve a further accurate determination.

To achieve the first object, according to a third aspect and feature of the present invention, there is provided a process for determining the lateral overturning of a vehicle, comprising the steps of: establishing a threshold value line on a two-dimensional map made using a rolling angle and a rolling angular speed of the vehicle as parameters, plotting a hysteresis line for an actual rolling angle and an actual rolling angular speed on the two-dimensional map, and determining that there is a possibility that the vehicle is overturning laterally or sideways when the hysteresis line traverses the threshold value line from a side nearer to an origin of the map to a side farther from the origin, the two-dimensional map including four quadrants in which the positive and negative signs of the rolling angle and the positive and negative signs of the rolling angular speed are combined with one another, whereby when the hysteresis line extends astride at least three of the quadrants and the distance of the hysteresis line from the origin is increased, the threshold value line is moved toward the origin.

With the above process, when the hysteresis line extends astride the at least three quadrants and the distance of the hysteresis line from the origin is increased, the threshold value line is moved toward the origin. Therefore, when the rolling angle of the vehicle is diverged due to a resonance, resulting in a state in which the vehicle is liable to overturn laterally or sideways, it is much more likely possible that the hysteresis line traverses the moved threshold value line from the side nearer to the origin to the side farther from the origin, thereby early determining that there is a possibility that the vehicle is overturning laterally or sideways.

To achieve the first object, according to a fourth aspect and feature of the present invention, there is provided a process for determining the lateral overturning of a vehicle, comprising the steps of: establishing a threshold value line on a two-dimensional map made using a rolling angle and a rolling angular speed of the vehicle as parameters, plotting a hysteresis line for an actual rolling angle and an actual rolling angular speed on the two-dimensional map, and determining that there is a possibility that the vehicle is overturning laterally or sideways when the hysteresis line traverses the threshold value line from a side nearer to an origin of the map to a side farther from the origin, the threshold value line being changed depending on a direction of change in steering angle of the vehicle.

With the above process, the threshold value line established on the two-dimensional map made using the rolling angle and the rolling angular speed of the vehicle as parameters is changed depending on the direction of change in steering angle of the vehicle. Therefore, it is possible to compensate for a variation in the possibility of lateral overturning of the vehicle depending on the direction of change in steering angle of the vehicle, to achieve a further accurate determination.

To achieve the first object, according to a fifth aspect and feature of the present invention, there is provided a process for determining the lateral overturning of a vehicle, comprising the steps of: establishing a threshold value line on a two-dimensional map made using a rolling angle and a rolling angular speed of the vehicle as parameters, plotting a hysteresis line for an actual rolling angle and an actual rolling angular speed on the two-dimensional map, and determining that there is a possibility that the vehicle is overturning laterally or sideways when the hysteresis line traverses the threshold value line from a side nearer to an origin of the map to a side farther from the origin, the threshold value line being changed depending on a rolling angular acceleration of the vehicle.

With the above process, the threshold value line established on the two-dimensional map made using the rolling angle and the rolling angular speed of the vehicle as parameters is changed depending on the rolling angular acceleration of the vehicle. Therefore, it is possible to compensate for a variation in possibility of lateral overturning of the vehicle depending on the rolling angular acceleration of the vehicle, to achieve a further accurate determination.

To achieve the second object, according to a sixth aspect and feature of the present invention, there is provided a system for detecting an angle of inclination of a vehicle, comprising: a first detecting means for continuously detecting an angle of inclination of the vehicle with respect to a direction of the force of gravity; a second detecting means for continuously detecting an amount of change in angle of inclination of the vehicle by integrating the angular speed of the vehicle; and an adding means for adding a first output from the first detecting means and a second output from the second detecting means to calculate an angle of inclination of the vehicle.

With the above arrangement, the output from the first detecting means for continuously detecting the angle of inclination of the vehicle with respect to the direction of the force of gravity and the output from the second detecting means for continuously detecting the amount of change in angle of inclination of the vehicle by integrating the angular speed of the vehicle are added to each other in the adding means to calculate the angle of inclination of the vehicle. Therefore, even if an error is generated in one of the outputs from the first and second detecting means, the influence of such error can be alleviated by the other accurate output, thereby enhancing the accuracy of the detection of the inclination angle of the vehicle.

The above and other objects, features and advantages of the invention will become apparent from the following detailed description of the preferred embodiments taken in conjunction with the accompanying drawings.

BRIEF DESCRIPTION OF THE DRAWINGS

FIGS. 1 to 7 show a first embodiment of the present invention, wherein

FIG. 1 is a diagram showing the different types of lateral overturning of a vehicle;

FIG. 2 is a diagram or graph for explaining the relationship between the rolling angle θ as well as the rolling angular speed ω of the vehicle and the possibility of lateral overturning of the vehicle;

FIG. 3 is a map or graph for determining whether there is a possibility that the vehicle is overturning laterally or sideways;

FIG. 4 is a schematic block diagram of a control system for an inflatable curtain;

FIG. 5 is a schematic diagram for explaining a technique for calculating an initial value $\theta_0$ of a rolling angle θ from a vehicular lateral acceleration Gy;

FIG. 6 is a diagram or graph showing the movement of a threshold value line based on a vehicular lateral acceleration Gy and the movement of a threshold value line based on a vehicular lateral speed Vy; and FIG. 7 is a flow chart for explaining the operation of a control system for the embodiment;

FIGS. 8 to 10 show a second embodiment of the present invention, wherein

FIG. 8 is a schematic block diagram of a control system for an inflatable curtain;

FIG. 9 is a schematic diagram showing the movements of threshold value lines; and FIG. 10 is a flow chart for explaining the operation of the control system for the embodiment;

FIGS. 11 and 12 show a third embodiment of the present invention, wherein

FIG. 11 is a schematic block diagram of a control system for an inflatable curtain; and FIG. 12 is a flow chart for explaining the operation of the control system for the embodiment;

FIGS. 13 and 14 show a fourth embodiment of the present invention, wherein

FIG. 13 is a schematic block diagram of a control system for an inflatable curtain; and FIG. 14 is a flow chart for explaining the operation of the control system for the embodiment;

FIGS. 15 and 16 show a fifth embodiment of the present invention, wherein

FIG. 15 is a schematic block diagram of a control system for an inflatable curtain; and FIG. 16 is a schematic diagram for explaining the operation for calculating a rolling angle of the vehicle from a vehicular lateral acceleration Gy in a first detecting means;

FIGS. 17 and 18 show a sixth embodiment of the present invention, wherein

FIG. 17 is a schematic diagram showing a rolling angle detecting system; and

FIG. 18 is a diagram or graph for explaining characteristics of a low-pass filter and a high-pass filter;

DETAILED DESCRIPTION OF THE PREFERRED EMBODIMENTS

A first embodiment of the present invention will now be described with reference to FIGS. 1 to 7.

FIG. 1 shows types of lateral overturning of a vehicle, which are classified by causes. The types of lateral overturning of the vehicle are classified into "simple roll", "simple roll+lateral speed" and "divergence" depending on the behavior of the vehicle in the course of leading to the lateral overturning. The lateral overturning of the "simple roll" type is further sub-classified into "flip-over", "climb-over" and "fall-over". The lateral overturning of the "simple roll+lateral speed" type is typically called "trip-over", and the lateral overturning of the "divergence" is typically called "turn-over".

The "flip-over" is a lateral overturning resulting from climbing of one of left and right wheels of the vehicle onto an obstacle. The "climb-over" is a lateral overturning resulting from the vehicle being overturned laterally or sideways with its tire lifted up from a road surface due to climbing of a bottom of the vehicle onto an obstacle. The "fall-over" is a lateral overturning resulting from stepping of one of left and right wheels of the vehicle over and down the edge of a road. The "trip-over" is a lateral overturning caused by a rolling moment produced about a curb or the like when one of left and right tires collides against the curb or the like as a result of lateral slipping of the vehicle. The "turn-over" is a lateral overturning resulting from the diverging of the angle of roll of the vehicle due to a resonance, when a driver attempts to operate a steering wheel alternately leftwards and rightwards in order to make a double-lane change or a triple-lane change or to pass an S-shaped road, if a frequency of such operation of the steering wheel is close to a frequency of inherent vibration of a suspension of the vehicle.

Figure 2:
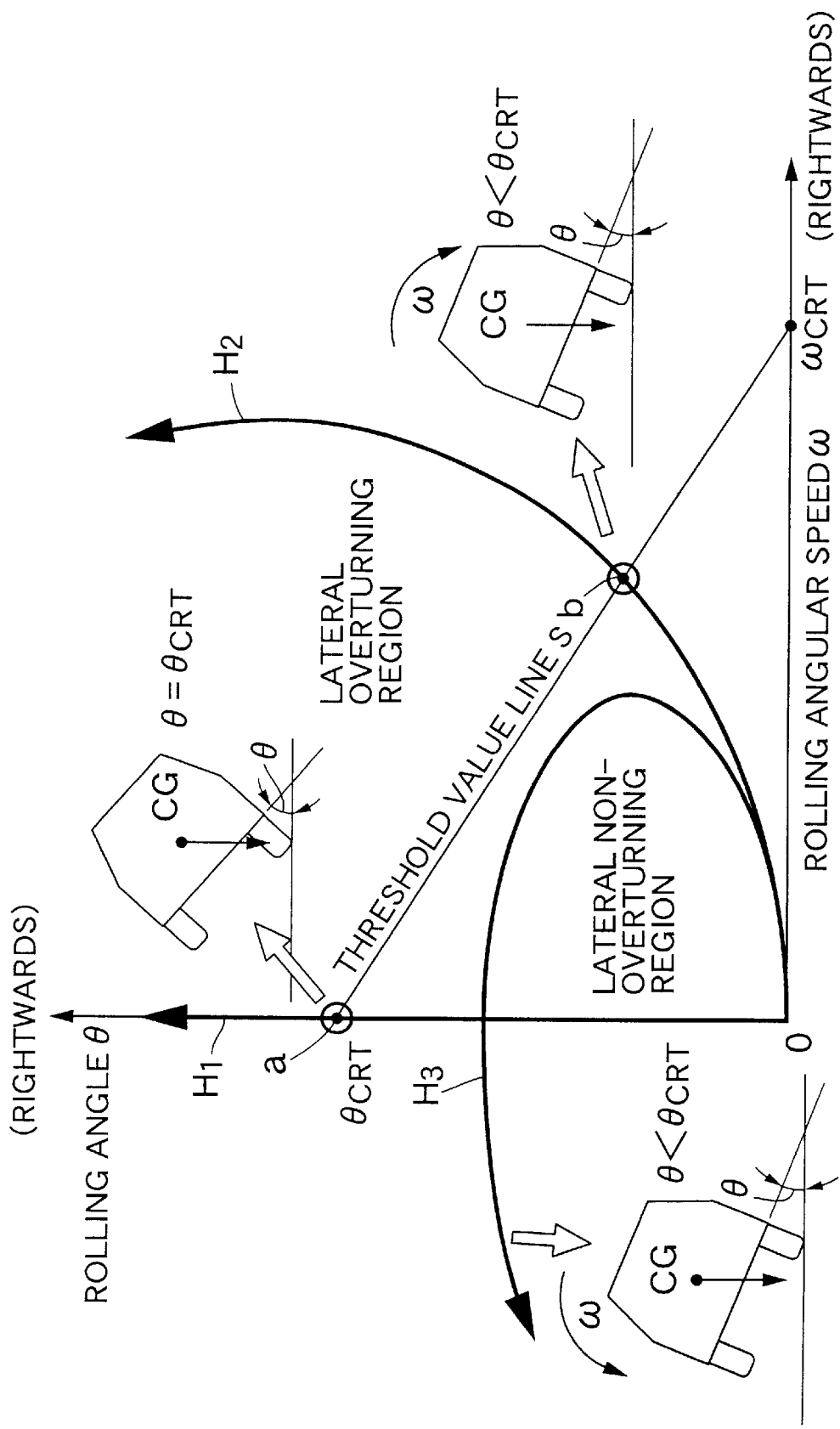

FIG. 2 shows a portion (a first quadrant) of a two-dimensional map for determining a possibility of lateral overturning of the vehicle, wherein the positive value (above the origin) of the rolling angle θ on the axis of ordinates corresponds to the rightward rolling angle, and the positive value (on the right side of the origin) of the rolling angular speed ω on the axis of abscissas corresponds to the rightward rolling angular speed. A threshold value line S comprising a rightward declined straight line is established in the two-dimensional map. In this map, a region on the side of the threshold value line S nearer to the origin, namely, a region where the rolling angle θ and the rolling angular speed ω are small, is a lateral non-overturning region, and a region on the side of the threshold value line S farther from the origin, namely, a region where the rolling angle θ and the rolling angular speed ω are large, is a lateral overturning region. If hysteresis lines $H_1$, $H_2$ and $H_3$ for the actual rolling angle θ and the actual rolling angular speed ω of the vehicle traverse the threshold value line S from the lateral non-overturning region on the side nearer to the origin to the lateral overturning region on the side farther from the origin, it is determined that there is a possibility of lateral overturning of the vehicle.

The hysteresis line $H_1$ corresponds to a case where only the rolling angle θ has been slowly increased with the rolling angular speed ω maintained at 0 (zero) from a state in which both of the rolling angle θ and the rolling angular speed ω have been 0 (i.e., from the origin). When the rolling angle θ has reached a critical rolling angle $θ_{CRT}$ at a point a which is an intercept at which the threshold value line S intersects the axis of ordinates, it is determined that there is a possibility of lateral overturning of the vehicle. At this time, the position CG of the center of gravity of the vehicle is on a vertical line extending through a tire which is an outer tire in a rolling direction and which is a fulcrum of rolling. This state is a limitation of static stability regarding the lateral overturning of the vehicle. The value of the critical rolling angle $θ_{CRT}$ is varied depending on the shape and the loaded state of the vehicle, but is generally on the order of 50°.

Even if the rolling angle θ is 0, when a large rolling angular speed ω is applied, there is a possibility that the vehicle may be overturned laterally. The rolling angular speed ω at this time is defined as a critical rolling angular speed $ω_{CRT}$, which is the point where the threshold value line S crosses the axis of the abscissas.

When the vehicle has a rolling angular speed ω in the same direction as the direction of the rolling angle θ, the lateral overturning is promoted by this rolling angular speed ω. Therefore, even if the vehicle is in a state in which the rolling angle θ is smaller than the critical rolling angle $θ_{CRT}$, the lateral overturning may occur. For example, when the hysteresis line for the rolling angle θ and the rolling angular speed ω is represented by $H_2$, it is determined that there is a possibility of lateral overturning of the vehicle at a point b where the hysteresis line $H_2$ traverses the threshold value line S from the side nearer to the origin to the side farther from the origin. The rolling angle θ at this time is a value smaller than the critical rolling angle $θ_{CRT}$.

When the hysteresis line for the rolling angle θ and the rolling angular speed ω is represented by $H_3$, the rolling angular speed ω, assuming an initial positive value, is changed quickly from an increasing value to a decreasing value and is further decreased to a negative value and hence, the hysteresis line $H_3$ does not traverse the threshold value line S. Therefore, it is determined that there is not a possibility of lateral overturning of the vehicle.

Figure 3:
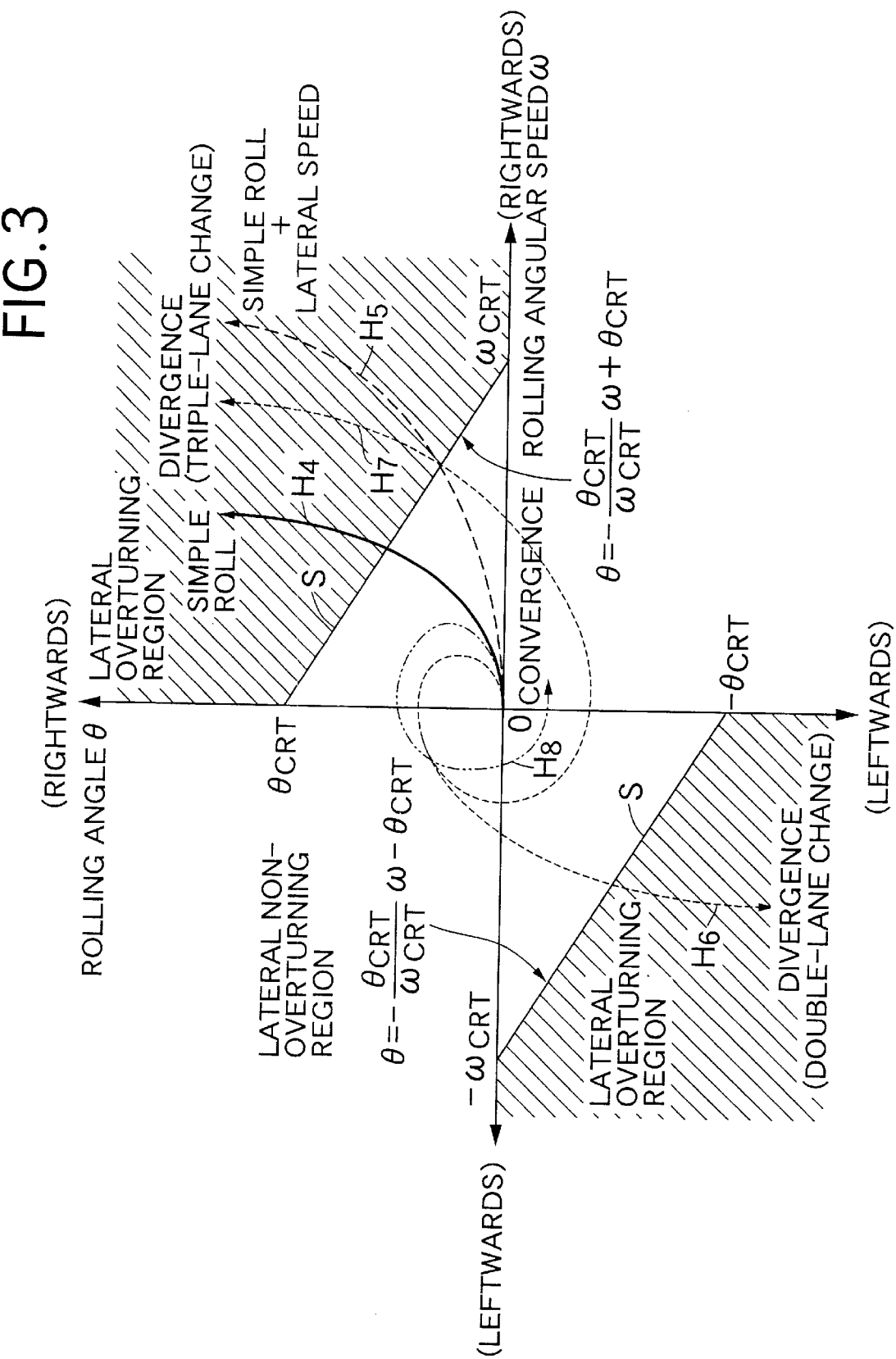

FIG. 3 shows the entire two-dimensional map for determining the possibility of lateral overturning of the vehicle. Two threshold value lines S, S are established in a first quadrant and a third quadrant, respectively, and are point-symmetric about the origin. The reason why a lateral overturning region is not established in each of a second quadrant where the rolling angle θ is positive and the rolling angular speed ω is negative, and a fourth quadrant where the rolling angle θ is negative and the rolling angular speed ω is positive, is that the lateral overturning of the vehicle does not occur in a state in which a rolling angular speed ω in a direction opposite from the direction of the rolling angle θ has been generated.

Hysteresis lines $H_4$, $H_5$, $H_6$, $H_7$, and $H_8$ for the rolling angle θ and the rolling angular speed ω, corresponding to the various types of the lateral overturning described with reference to FIG. 1, are shown in FIG. 3.

The hysteresis line $H_4$ corresponds to the lateral overturning of the "simple roll" type such as "flip-over", "climb-over", "fall-over", wherein the absolute value of the rolling angle θ and the absolute value of the rolling angular speed ω are simply increased, resulting in the lateral overturning of the vehicle.

The hysteresis line $H_5$ corresponds to the lateral overturning of the "simple roll+lateral speed" type called "trip-over", wherein the rolling angular speed ω is sharply increased, resulting in the lateral overturning, due to the rolling moment generated by the collision of a tire against a curb or the like in the course of lateral slipping of the vehicle.

The hysteresis lines $H_6$ and $H_7$ correspond to the lateral overturning of the "divergence" type called "turn-over". The hysteresis line $H_6$ indicates the lateral overturning upon the double-lane change. In this case, in the course where the vehicle has rolled rightwards upon the first lane change and is then rolled leftwards upon the next lane change, the absolute value of the rolling angle θ is diverged past the threshold value line S in the third quadrant, resulting in the lateral overturning. The hysteresis line $H_7$ indicates the lateral overturning upon the triple-lane change. In this case, in the course where the vehicle has rolled rightwards upon the first lane change, then rolled leftwards upon the next lane change, and rolled again rightwards upon the subsequent lane change, the absolute value of the rolling angle θ is diverged past the threshold value line S in the first quadrant, resulting in the lateral overturning.

In the hysteresis line $H_8$, the rolling angle θ is converged toward the origin before ever passing the threshold value line S, and in this case, the vehicle cannot be overturned laterally or sideways.

Figure 4:
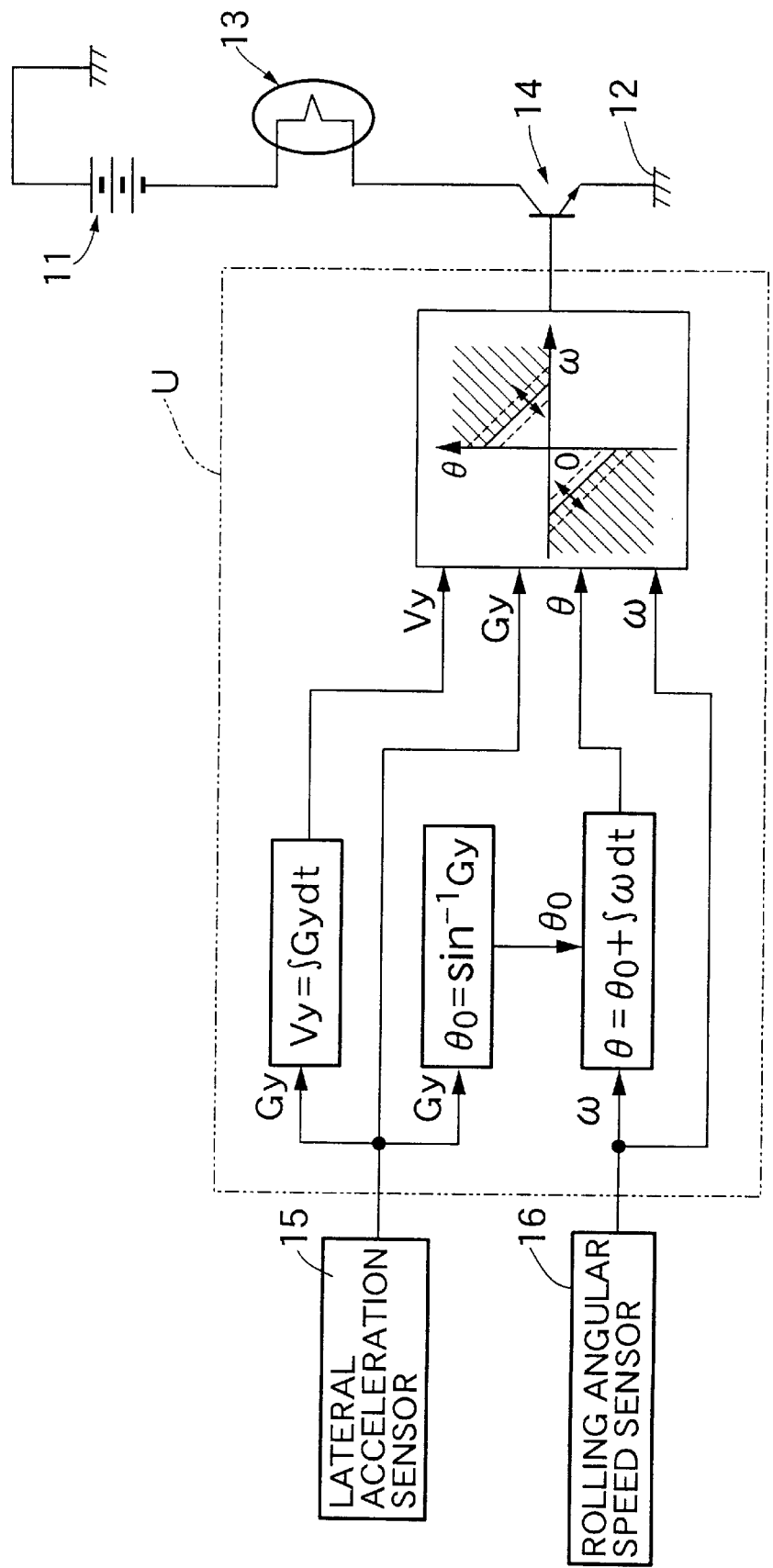

FIG. 4 shows a control system for deploying an inflatable curtain for restraining an occupant along an inner surface of a vehicle compartment upon the lateral overturning of the vehicle.

An inflator 13 for generating a high-pressure gas for deploying the inflatable curtain and an ignition transistor 14 are connected in series between a battery 11 and a ground 12. When the ignition transistor 14 is turned on by a command from an electronic control unit U, the inflator 13 is ignited to generate the high-pressure gas, and the inflatable curtain supplied with the high-pressure gas is deployed along the inner surface of the vehicle compartment. To determine whether there is a possibility of lateral overturning of the vehicle, a signal from a lateral acceleration sensor 15 for detecting a lateral acceleration Gy, which is an acceleration in a lateral direction of the vehicle body, and a signal from a rolling angular speed sensor 16, for detecting a rolling angular speed ω of the vehicle, are input to the electronic control unit U.

Figure 5:
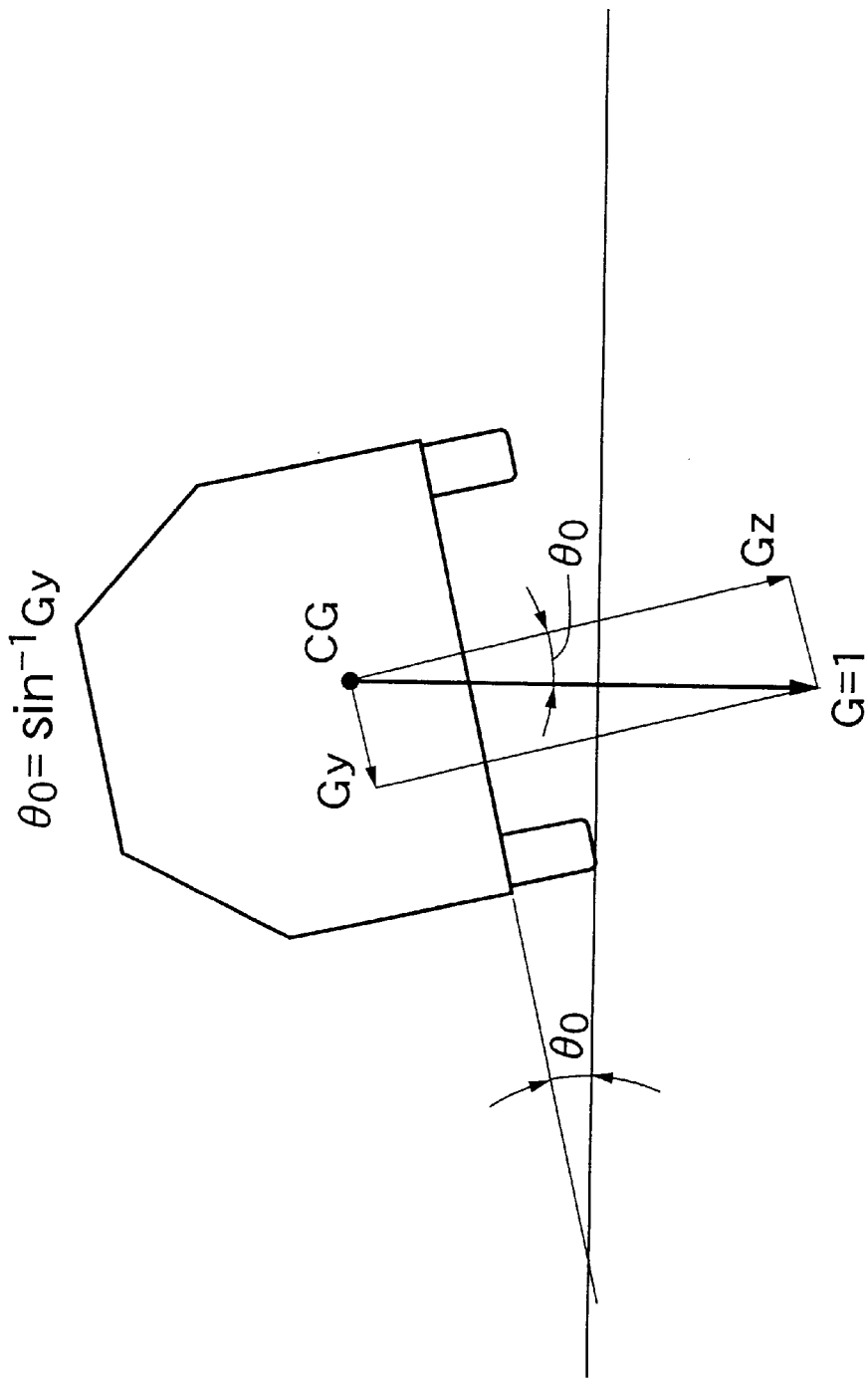

As shown in FIG. 5, the lateral acceleration sensor 15 fixed to the vehicle body outputs a lateral acceleration Gy at a time point of turning-on of an ignition switch. When the ignition switch has been turned on, the vehicle is in its stopped state and hence, a lateral acceleration due to a centrifugal force produced with the turning movement of the vehicle cannot be detected, and only a component of a gravitational acceleration G in the lateral direction of the vehicle body is detected as a lateral acceleration Gy. Therefore, an initial value of rolling angle $\theta_0$ of the vehicle can be calculated using the lateral acceleration Gy according to an equation, $\theta_0 = \sin^{-1}$ Gy.

When the initial value $\theta_0$ of rolling angle $\theta$ of the vehicle has been calculated based on an output from the lateral acceleration sensor 15 at the time point of turning-on of the ignition switch in the above manner, a rolling angle $\theta$ of the vehicle is calculated by adding a value of variation in rolling angle $\theta$ to the initial value $\theta_0$. More specifically, the rolling angle $\theta$ of the vehicle is calculated by adding an integration value $\int \omega dt$ of a rolling angular speed $\omega$ output by the rolling angular speed sensor 16 from the time point turning-on of the ignition switch as a value of variation in rolling angle $\theta$ to the initial value $\theta_0$.

The lateral acceleration sensor 15 has a disadvantage that it cannot detect a lateral acceleration Gy during free dropping of the vehicle, and cannot recognize a lateral acceleration due to the centrifugal force generated with the turning movement of the vehicle as a lateral acceleration Gy which is a component of a gravitational acceleration G in the lateral direction of the vehicle body to misdetect it. However, the rolling angle $\theta$ can be correctly calculated, with such disadvantage eliminated, by using the lateral acceleration Gy output by the lateral acceleration sensor 15 only for the calculation of the initial value $\theta_0$ of rolling angle $\theta$ of the vehicle at the time point of turning-on of the ignition switch, and using the integration value $\int \omega dt$ of the rolling angular speed $\omega$ output by the rolling angular speed sensor 16 for the calculation of a subsequent rolling angle $\theta$ of the vehicle.

Figure 6:
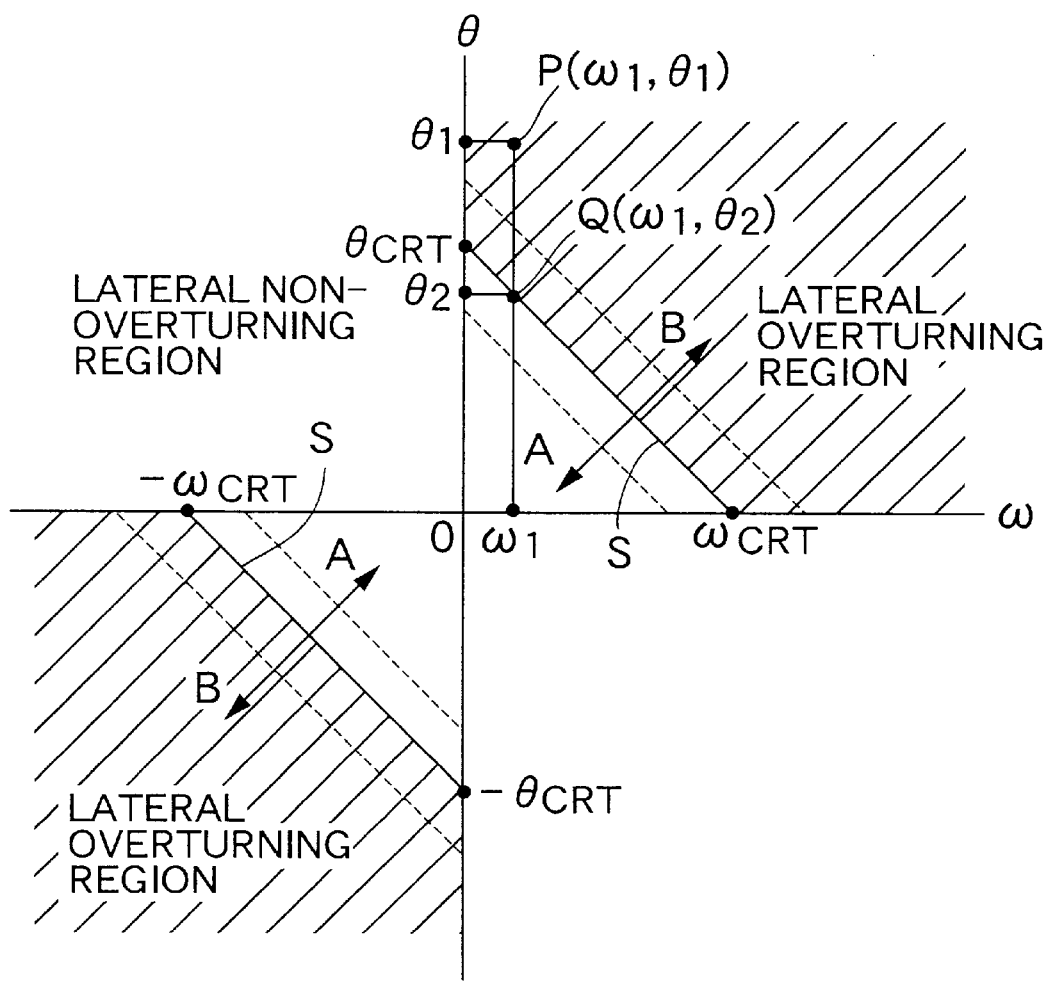

A hysteresis line, which is a locus of coordinate points formed by the rolling angle $\theta$ of the vehicle calculated in the above manner and the rolling angular speed $\omega$ output by the rolling angular speed sensor 16, is described on a map shown in FIG. 6. When the hysteresis line has traversed threshold value lines S, S from the side nearer to the origin to the side farther from the origin, it is determined that there is a possibility that the vehicle is overturning laterally or sideways, and the ignition transistor 14 is turned on to activate the inflator 13 for the inflatable curtain.

A centrifugal force having a magnitude depending on the turning radius and the vehicle speed is applied outwards in a turning direction to the vehicle, which is being turned. If the direction of a lateral acceleration Gy due to this centrifugal force coincides with the direction of a rolling angle $\theta$ of the vehicle or the direction of a rolling angular speed $\omega$ of the vehicle, the lateral overturning of the vehicle is promoted. In addition, if a road surface is inclined laterally, a lateral acceleration Gy is generated as a lateral component of a gravitational acceleration. If the direction of this lateral acceleration Gy coincides with the direction of a rolling angle $\theta$ of the vehicle or the direction of a rolling angular speed $\omega$ of the vehicle, the lateral overturning of the vehicle is also promoted.

Therefore, if the lateral acceleration detected by the lateral acceleration sensor 15 is applied in a direction to promote the lateral overturning of the vehicle, according to the embodiment, the threshold lines S, S are moved in a direction toward the origin, as shown by an arrow A in FIG. 6. As a result, it is much more likely that the hysteresis line for the rolling angle $\theta$ and the rolling angular speed $\omega$ will traverse the threshold value lines S, S for any random point of the hysteresis line and thus, it is possible to carry out a more accurate determination of a possibility of lateral overturning with the lateral acceleration Gy of the vehicle taken into consideration.

On the other hand, when the detected lateral acceleration Gy is in a direction to inhibit the lateral overturning of the vehicle, according to the embodiment, the threshold value lines S, S are moved in a direction away from the origin, as shown by an arrow B in FIG. 6, thereby making it much less likely that the hysteresis line will traverse the threshold value lines S, S for any random point of the hysteresis line. Thus, it is possible to carry out a more accurate determination of a possibility of lateral overturning with the lateral acceleration Gy of the vehicle taken into consideration. In any of the above-described cases, the amount by which the hysteresis line is moved is determined depending on the magnitude of the detected lateral acceleration Gy.

When the vehicle is slipped laterally, the lateral overturning of the vehicle is promoted by the lateral slipping, as is the lateral overturning of the "simple roll+lateral speed" type described with reference to FIG. 1. Therefore, the lateral acceleration-Gy detected by the lateral acceleration sensor 15 is integrated to calculate a lateral speed Vy. When the lateral speed Vy is applied in a direction to promote the lateral overturning of the vehicle, namely, when the lateral speed Vy is generated in a direction of inclination of the vehicle, according to the embodiment, the threshold value lines S, S are moved in the direction toward the origin, as shown by the arrow A in FIG. 6. As a result, it is much more likely that the hysteresis line for the rolling angle $\theta$ and the rolling angular speed $\omega$ will traverse the threshold value lines S, S for any random point on the hysteresis line and thus, it is possible to carry out a more accurate determination of a possibility of lateral overturning with the lateral speed Vy of the vehicle taken into consideration.

On the other hand, when the calculated lateral speed Vy is in a direction to inhibit the lateral overturning of the vehicle, according to the embodiment, the threshold lines S, S are moved in the direction away from the origin, as shown by the arrow B in FIG. 6, thereby making it much less likely that the hysteresis line will traverse the threshold value lines S, S for any random point on the hysteresis line. Thus, it is possible to carry out a more accurate determination of a possibility of lateral overturning with the lateral speed Vy of the vehicle taken into consideration. In any of the above-described cases, the amount by which the hysteresis line is moved is determined depending on the magnitude of the detected lateral speed Vy.

The movement of the threshold value lines S, S based on the lateral acceleration Gy of the vehicle and the movement of the threshold value lines S, S based on the lateral speed Vy can be used together or alone according to the embodiment of the present invention.

Figure 7:
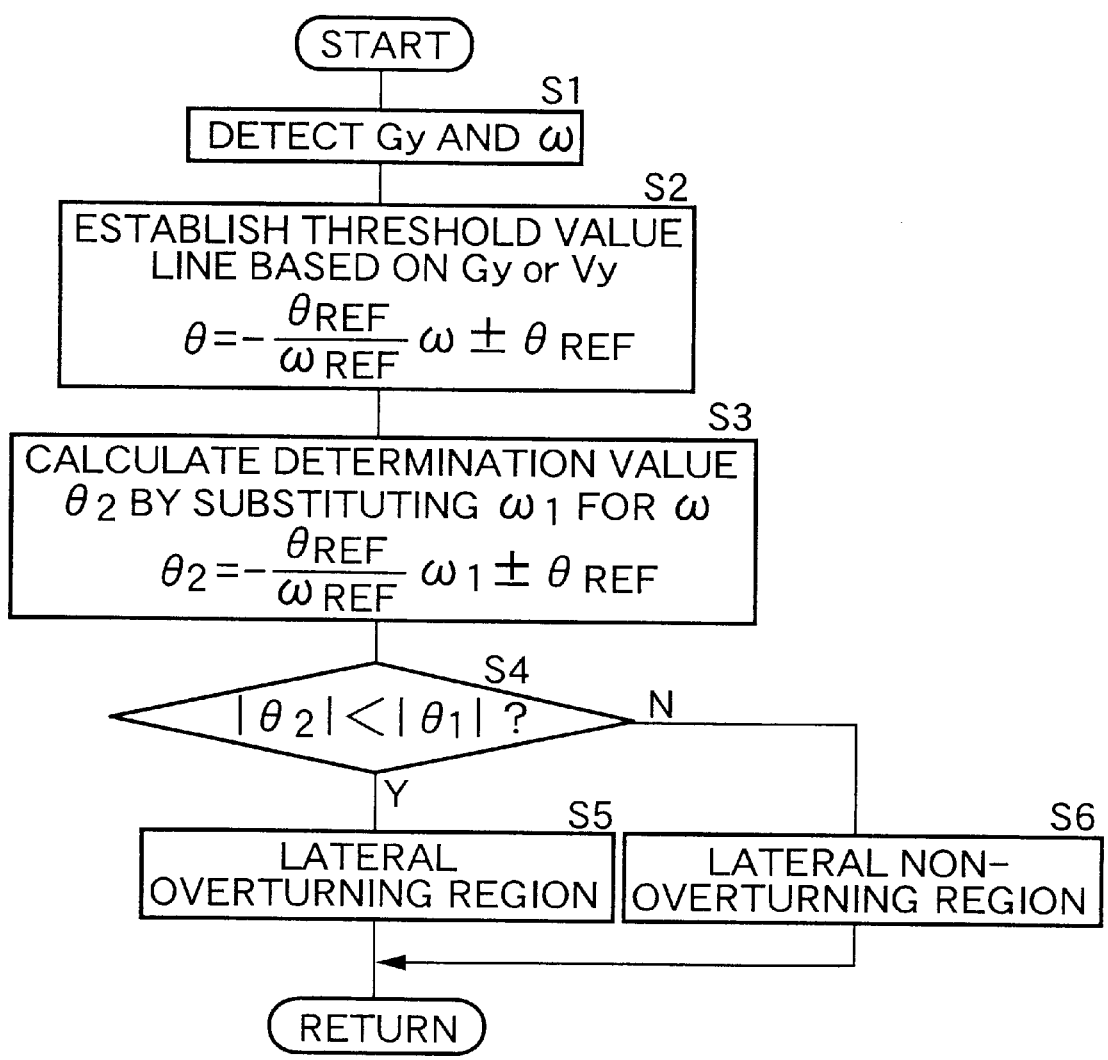

The above-described operation will be further described with the reference to FIGS. 6 and 7.

In FIG. 7 there is shown a flow chart of control operation according to the first embodiment of the invention. First, a lateral acceleration Gy and a rolling angular speed $\omega$ are read at Step S1, and threshold value lines S, S on the map are established in accordance with the lateral acceleration Gy or a lateral speed Vy calculated from the lateral acceleration Gy at Step S2. The threshold value lines S, S are determined, if a critical rolling angle $\theta_{CRT}$ which is an intercept with the axis of ordinates of the map and a critical rolling angular speed $\omega_{CRT}$ which is an intercept with the axis of abscissas of the map, are determined, as discussed below. In the present embodiment, when the lateral overturning of the vehicle is promoted due to the lateral acceleration Gy or the lateral speed Vy, as described above, both of the critical rolling angle $\theta_{CRT}$ and the critical rolling angular speed $\omega_{CRT}$ are decreased, whereby the threshold value lines S, S are moved in the direction toward the origin.

If the critical rolling angle $\theta_{CRT}$ and the critical rolling angular speed $\omega_{CRT}$ are determined, an equation for the threshold value lines S, S is given as follows (see FIG. 3):

$$\theta = -(\theta_{CRT}/\omega_{CRT})\omega \pm \theta_{CRT}$$

Subsequently, it is determined whether a coordinate point P provided by a current rolling angle $\theta_1$ and a current rolling angular speed $\omega_1$ is in the lateral overturning region or the lateral non-overturning region. More specifically, at Step S3, a current value of rolling angular speed $\omega_1$ is substituted for $\omega$ in the equation for the threshold value line S to calculate a determination value $\theta_2$. The determination value $\theta_2$ is a $\theta$ coordinate point which is a point Q of intersection between a straight line $\omega = \omega_1$ and the threshold value line S. At subsequent Step S4, the determination value $\theta_2$ is compared with the current rolling angle $\theta_1$. If a relation, $|\theta_2| < |\theta_1|$ is established, it is determined at Step S6 that the coordinate point P provided by the current rolling angle $\theta_1$ and the current rolling angular speed $\omega_1$ is in the lateral overturning region. If the relation, $|\theta_2| < |\theta_1|$ is not established, it is determined at Step S5 that the coordinate point P provided by the current rolling angle $\theta_1$ and the current rolling angular speed $\omega_1$ is in the lateral non-overturning region. A case ($|\theta_2| < |\theta_1|$) where the coordinate point P is in the lateral overturning region is shown in FIG. 6.

Figure 8:
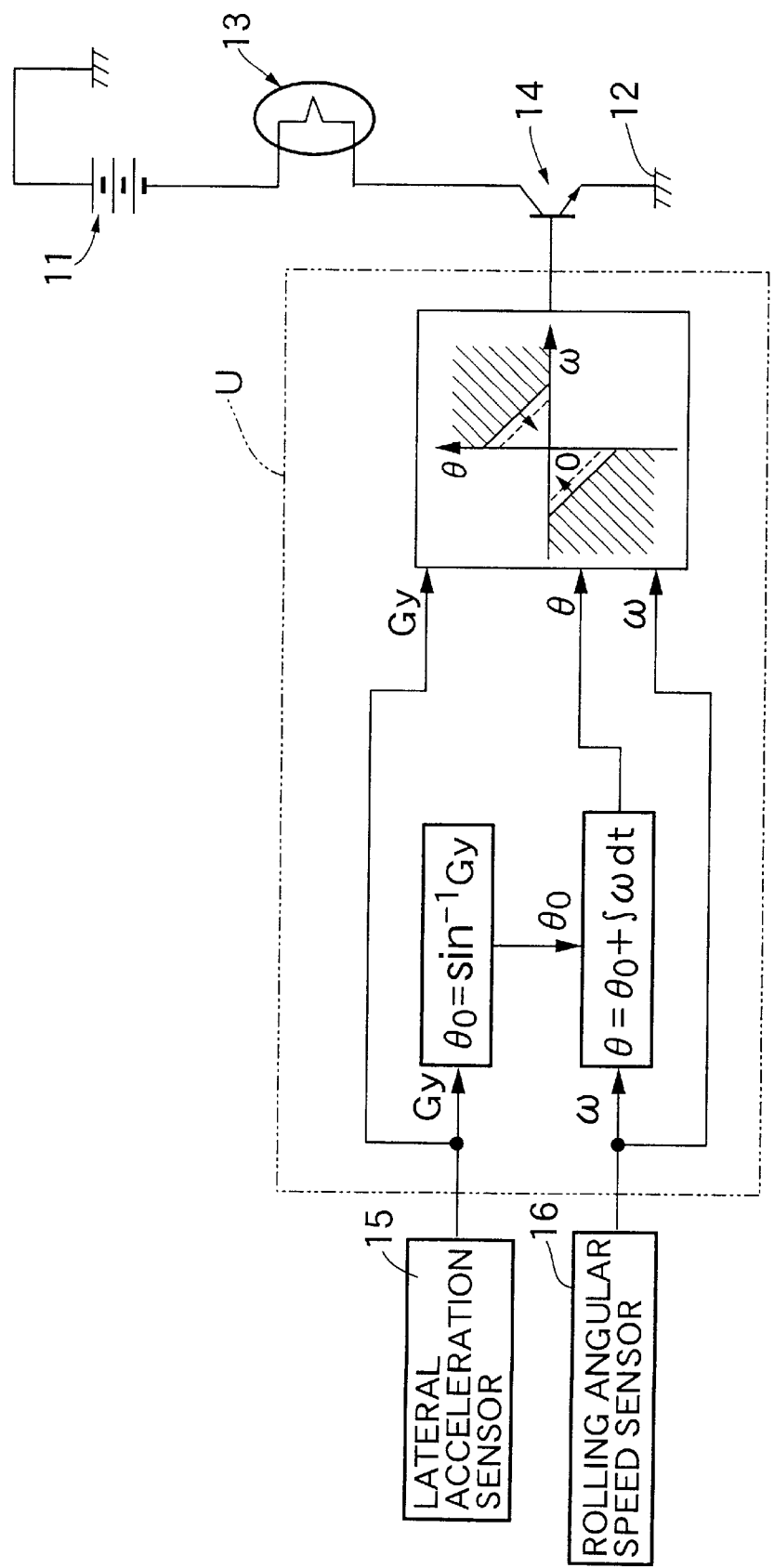

A second embodiment of the present invention will now be described with reference to FIGS. 8 to 10.

When the steering wheel is operated alternately in an order of leftwards→rightwards to carry out a double-lane change or in an order of leftwards→rightwards→leftwards to carry out a triple-lane change, a hysteresis line for the rolling angle $\theta$ and the rolling angular speed $\omega$ is of a counter clockwise volute shape about the origin. If the frequency of the operation of the steering wheel is close to the frequency of the inherent vibration of the suspension of the vehicle at this time, the rolling angle $\theta$ of the vehicle is diverged due to a resonance, whereby the distance of a hysteresis line from an origin is gradually increased. Therefore, if such resonance is generated on the double-lane change, the hysteresis line extends via first and second quadrants and intersects a threshold value line S in a third quadrant (see the hysteresis line $H_6$ in FIG. 3). If such resonance is generated on the triple-lane change, the hysteresis line extends via the first to fourth quadrants and intersects the threshold value line S in the first quadrant (see the hysteresis line $H_7$ in FIG. 3).

Figure 9:
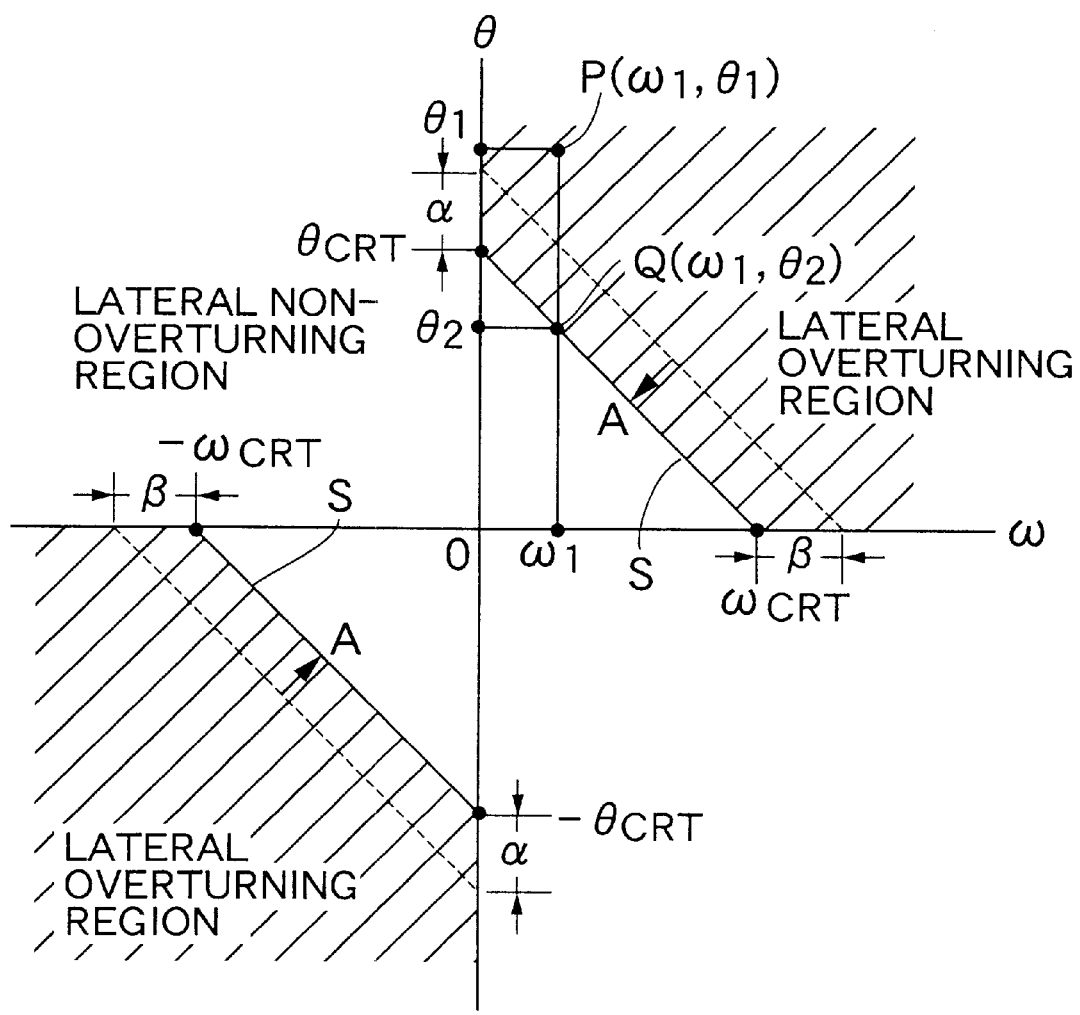

When the hysteresis line extends through at least three continuous quadrants, while the distance of the hysteresis line from the origin is gradually increased, it is determined that the vehicle is in a situation in which the lateral overturning thereof, due to a phenomenon of divergence of the rolling angle $\theta$, is liable to occur, and the threshold lines S, S are moved in a direction toward an origin, as shown by arrows A in FIG. 9. As a result, it is much more likely that the hysteresis line for the rolling angle $\theta$ and the rolling angular speed $\omega$ will traverse the threshold value line S, S for any random point on the hysteresis line. Thus, it is possible to carry out a more accurate determination of a possibility of lateral overturning with the phenomenon of the divergence of the rolling angle $\theta$ taken into consideration. The amount by which the hysteresis line is moved is determined depending on the magnitude of a rate of increase in distance of the detected hysteresis line from the origin.

The above-described operation will be further described with reference to FIGS. 9 and 10.

Figure 10:
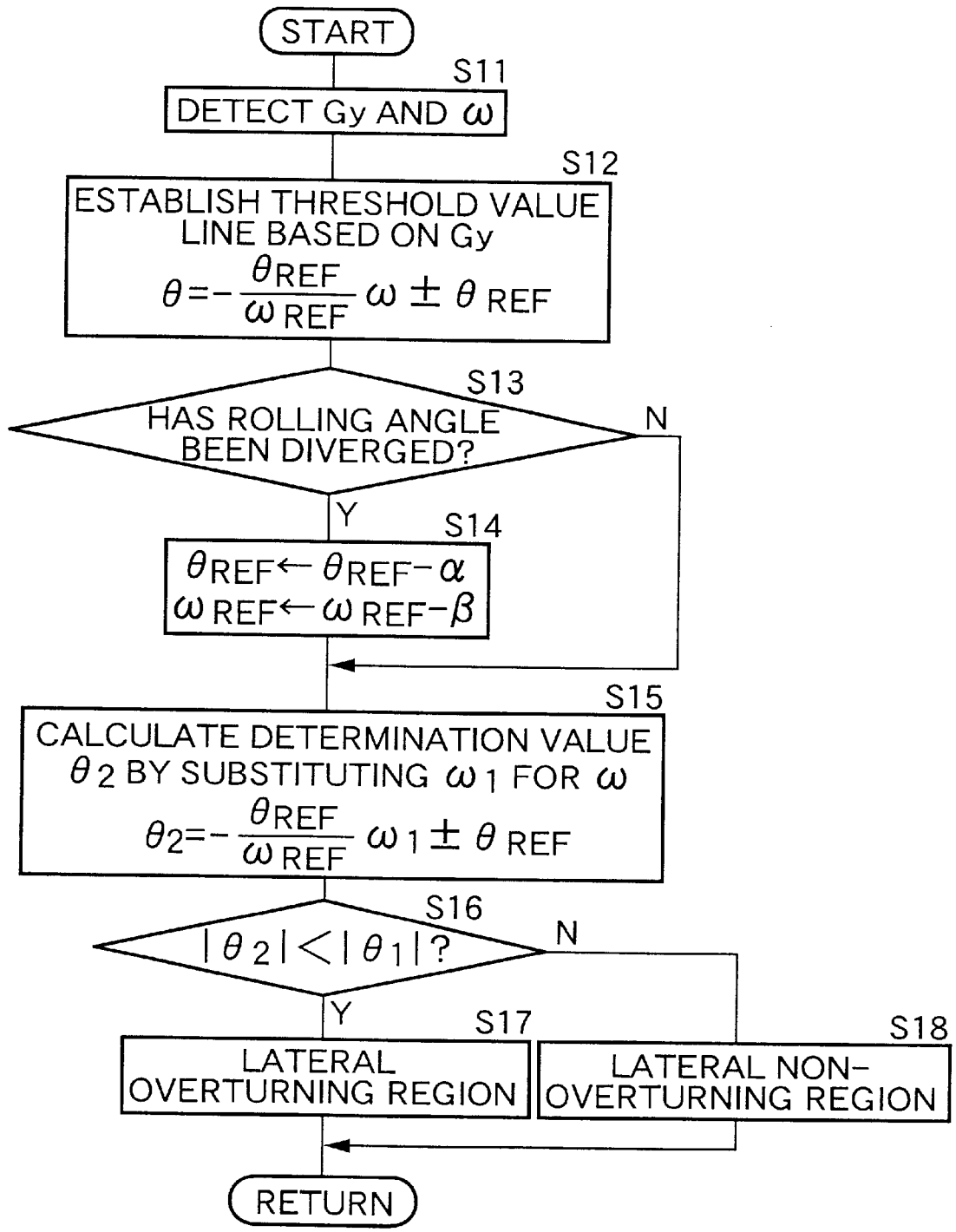

A flow of control operation according to the second embodiment is shown in FIG. 10. First, a lateral acceleration Gy and a rolling angular speed $\omega$ are read at Step S11, and threshold value lines S, S on the map are established in accordance with the lateral acceleration Gy at Step S12. The threshold value lines S, S are determined, if a critical rolling angle $\theta_{CRT}$ which is an intercept on the axis of ordinates of the map and a critical rolling angular speed $\omega_{CRT}$ which is an intercept on the axis of abscissas, are determined as discussed below. In the present embodiment, the threshold value lines S, S are determined, so that when the lateral overturning of the vehicle is promoted due to the lateral acceleration Gy, both of the critical rolling angle $\theta_{CRT}$ and the critical rolling angular speed $\omega_{CRT}$ are decreased, whereby the threshold value lines S, S are moved toward the origin.

If the critical rolling angle $\theta_{CRT}$ and the critical rolling angular speed $\omega_{CRT}$ are determined, an equation for the threshold value lines S, S is given as follows (see FIG. 3):

$$\theta = -(\theta_{CRT}/\omega_{CRT})\omega \pm \theta_{CRT}$$

At subsequent Step S13, it is determined whether the divergence of the rolling angle $\theta$ has occurred. More specifically, if the hysteresis line for the rolling angle $\theta$ and the rolling angular speed $\omega$ has been moved astride the three continuous quadrants, while the distance of the hysteresis line from the origin has been increased, it is determined that the divergence of the rolling angle $\theta$ has occurred. Then, at Step S14, the threshold value lines S, S determined at Step S12 are further moved in a direction toward the origin. More specifically, the critical rolling angle $\theta_{CRT}$ is decreased by $\alpha$ to determine a new critical rolling angle $\theta_{CRT}$, and the critical rolling angular speed $\omega_{CRT}$ is decreased by $\beta$ to determine a new critical rolling angular speed $\omega_{CRT}$, thereby determining new threshold value lines S, S.

Subsequently, it is determined whether a coordinate point P provided by a current rolling angle $\theta_1$ and a current rolling angular speed $\omega_1$ is in the lateral overturning region or the lateral non-overturning region. More specifically, at Step S15, a current value of rolling angular speed $\omega_1$ is substituted for $\omega$ in the equation for the threshold value line S to calculate a determination value $\theta_2$. The determining value $\theta_2$ is a $\theta$ coordinate point which is a point Q of intersection between a straight line $\omega = \omega_1$ and the threshold value line S. At subsequent Step S16, the determination value $\theta_2$ is compared with the current rolling angle $\theta_1$. If a relation, $|\theta_2| < |\theta_1|$ is established, it is determined at Step S17 that the coordinate point P provided by the current rolling angle $\theta_1$ and the current rolling angular speed $\omega_1$ is in the lateral overturning region. If the relation, $|\theta_2| < |\theta_1|$ is not established, it is determined at Step S18 that the coordinate point P provided by the current rolling angle $\theta_1$ and the current rolling angular speed $\omega_1$ is in the lateral non-overturning region. A case ($|\theta_2| < |\theta_1|$) where the coordinate point P is in the lateral overturning region is shown in FIG. 9.

Figure 11:
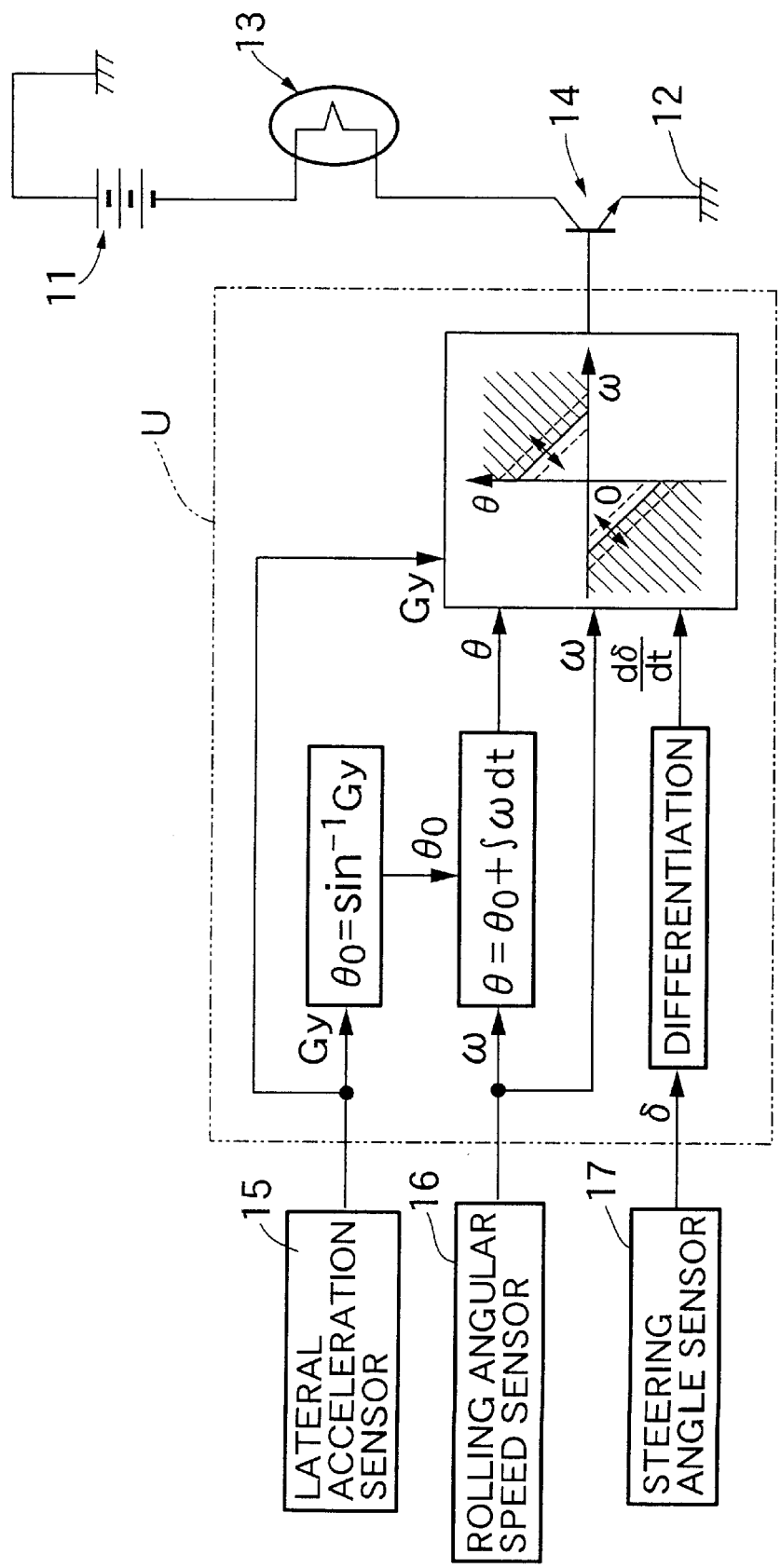

A third embodiment of the present invention will now be described with reference to FIGS. 11 to 12, as well as to FIG. 9, which also applies to the third embodiment.

When the steering wheel is operated leftwards, the vehicle body is rolled rightwards under the action of a centrifugal force. On the other hand, when the steering wheel is operated rightwards, the vehicle body is rolled leftwards under the action of a centrifugal force. The magnitude of the centrifugal force generated at this time becomes larger, as the radius of turning of the vehicle is smaller and as the vehicle speed is higher. Therefore, when the rolling angle $\theta$ and the rolling angular speed $\omega$ of the vehicle are in the first quadrant in FIG. 3 to indicate that there is a possibility that the vehicle is overturning rightwards, if the steering wheel is additionally turned leftwards, there is a possibility that the lateral overturning is further promoted. On the other hand, when the rolling angle $\theta$ and the rolling angular speed $\omega$ of the vehicle are in the third quadrant in FIG. 3 to indicate that there is a possibility that the vehicle is overturning leftwards, if the steering wheel is additionally turned rightwards, there is a possibility that the lateral overturning is further promoted.

Therefore, when the direction of change in steering angle $\delta$ detected by a steering angle sensor 17 (see FIG. 11) (namely, the sign of a time-differentiation value of the steering angle $\delta$) is a direction to increase the absolute value of a rolling angle $\theta$ of the vehicle, namely, when the rate $d\delta/dt$ of change in steering angle is negative (the steering angle $\delta$ is increased leftwards) when the rolling angle $\theta$ is positive (in a rightward direction), and when the rate $d\delta/dt$ of change in steering angle is positive (the steering angle $\delta$ is increased rightwards) when the rolling angle $\theta$ is negative (in a leftward direction), the threshold value lines S, S are moved in a direction toward the origin, as shown by the arrows A in FIG. 9. As a result, it is made much more likely that the hysteresis line for the rolling angle $\theta$ and the rolling angular speed $\omega$ will traverse the threshold value lines S, S. Thus, it is possible to more accurately carry out the determination of a possibility of lateral overturning with the direction of change in steering angle $\delta$ of the vehicle taken into consideration.

On the other hand, when the detected steering angle $\delta$ acts to decrease the absolute value of the rolling angle $\theta$ of the vehicle, namely, when the rate $d\delta/dt$ of change in steering angle $\delta$ is positive (the steering angle $\delta$ is increased rightwards) when the rolling angle $\theta$ is positive (in the rightward direction), and when the rate $d\delta/dt$ of change in steering angle $\delta$ is negative (the steering angle $\delta$ is increased leftwards) when the rolling angle $\theta$ is negative (in the leftward direction), the threshold value lines S, S are moved in a direction away from the origin, contrary to the above-description. This makes it much less likely that the hysteresis line will traverse the threshold value lines S, S and thus, it is possible to more accurately carry out the determination of a possibility of lateral overturning with the direction of change in steering angle $\delta$ of the vehicle taken into consideration. In any of the above cases, the amount by which the hysteresis line is moved is determined depending on the magnitude of the rate $d\delta/dt$ of lateral change in detected steering angle.

The above-described operation will be further described with reference to FIGS. 9 and 12.

Figure 12:
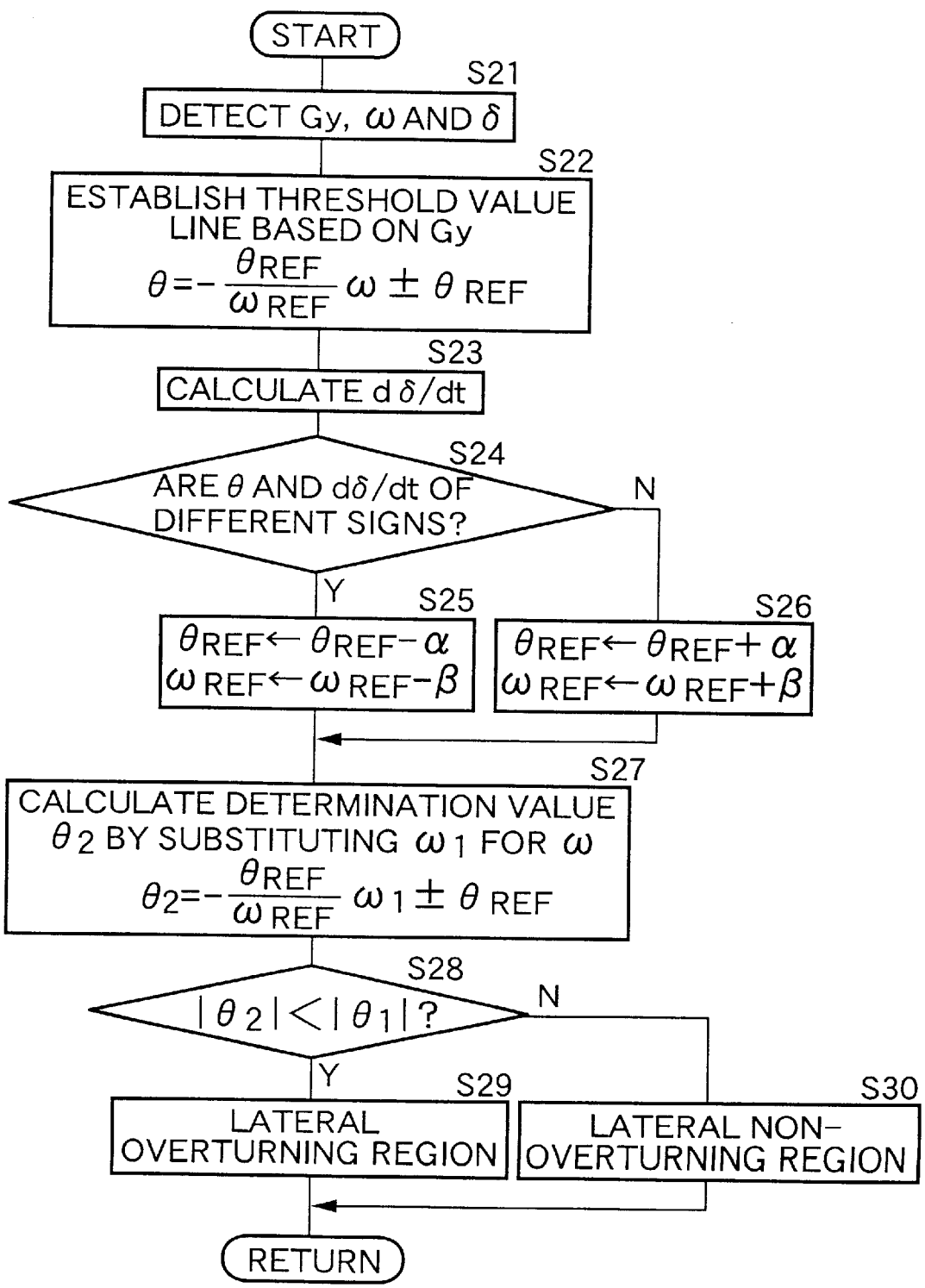

A flow of control operation according to the third embodiment is shown in FIG. 12. First, a lateral acceleration Gy, a rolling angular speed $\omega$ and a steering angle $\delta$ are read at Step S21, and threshold value lines S, S on the map are established in accordance with the lateral acceleration Gy at Step S22. The threshold value lines S, S are determined, if a critical rolling angle $\theta_{CRT}$, which is an intercept on the axis of ordinates of the map, and a critical rolling angular speed $\omega_{CRT}$, which is an intercept on the axis of abscissas, are determined as discussed below. In the present embodiment, the threshold value lines S, S are determined such that when the lateral overturning of the vehicle is promoted due to the lateral acceleration Gy, both of the critical rolling angle $\theta_{CRT}$ and the critical rolling angular speed $\omega_{CRT}$ are decreased, whereby the threshold value lines S, S are moved toward the origin.

If the critical rolling angle $\theta_{CRT}$ and the critical rolling angular speed $\omega_{CRT}$ are determined, an equation for the threshold value lines S, S is given as follows (see FIG. 3):

$$\theta = -(\theta_{CRT}/\omega_{CRT})\omega \pm \theta_{CRT}$$

At subsequent Step S23, the steering angle $\delta$ is differentiated to calculate a steering angular speed $d\delta/dt$. Then, at Step S24, the sign of the steering angle $\delta$ is compared with the sign of the steering angular speed $d\delta/dt$. If the sign of the steering angle $\delta$ and the sign of the steering angular speed $d\delta/dt$ are different from each other, it is determined that the lateral overturning of the vehicle is promoted by the steering. At Step S25, the threshold value lines S, S determined at Step S22 are moved in the direction toward the origin. More specifically, the critical rolling angle $\theta_{CRT}$ is decreased by $\alpha$ to determine a new critical rolling angle $\theta_{CRT}$, and the critical rolling angular speed $\omega_{CRT}$ is decreased by $\beta$ to determine a new critical rolling angular speed $\omega_{CRT}$, thereby determining new threshold value lines S, S.

On the other hand, if the sign of the steering angle $\delta$ and the sign of the steering angular speed $d\delta/dt$ coincide with each other at Step S24, it is determined that the lateral overturning of the vehicle is inhibited by the steering. At Step S26, the threshold value lines S, S determined at Step S22 are moved in the direction away from the origin. More specifically, the critical rolling angle $\theta_{CRT}$ is increased by $\alpha$ to determine a new critical rolling angle $\theta_{CRT}$, and the critical rolling angular speed WCRT is increased by $\beta$ to determine a new critical rolling angular speed $\omega_{CRT}$, thereby determining new threshold value lines S, S.

Then, it is determined whether a coordinate point P provided by a current rolling angle $\theta_1$ and a current rolling angular speed $\omega_1$ is in the lateral overturning region or a lateral non-overturning region. More specifically, at Step S27, a current value of rolling angular speed $\omega_1$ is substituted for $\omega$ in the equation for the threshold value line S to calculate a determination value $\theta_2$. The determining value $\theta_2$ is a $\theta$ coordinate point which is a point Q of intersection between a straight line $\omega = \omega_1$ and the threshold value line S. At subsequent Step S28, the determination value $\theta_2$ is compared with the current rolling angle $\theta_1$. If a relation, $|\theta_2| < |\theta_1|$ is established, it is determined at Step S29 that the coordinate point P provided by the. current rolling angle $\theta_1$ and the current rolling angular speed $\omega_1$ is in the lateral overturning region. If the relation, $|\theta_2| < |\theta_1|$ is not established, it is determined at Step S30 that the coordinate point P provided by the current rolling angle $\theta_1$ and the current rolling angular speed $\omega_1$ is in the lateral non-overturning region. Again, a case ($|\theta_2| < |\theta_1|$) where the coordinate point P is in the lateral overturning region is shown in FIG. 9.

Figure 13:
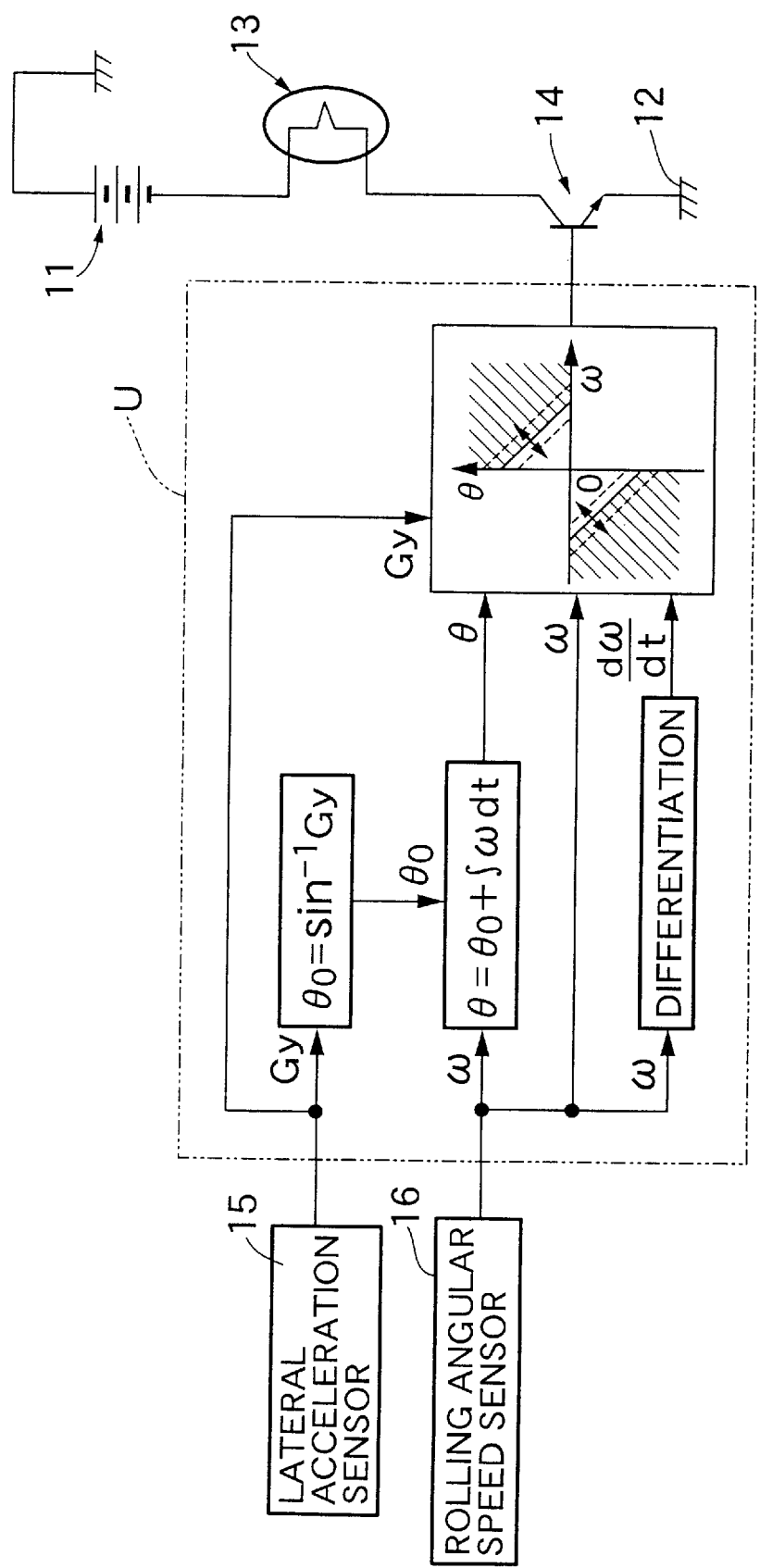

A fourth embodiment of the present invention will now be described with reference to FIGS. 13 and 14.

When a hysteresis line is in a first quadrant or a third quadrant to indicate that a rolling angular speed $\omega$ in the same direction as that of the rolling angle $\theta$ has been generated, if a rolling angular acceleration $d\omega/dt$ provided by time-differentiating the rolling angular speed $\omega$ has been generated in a direction to increase the absolute value of the rolling angular speed $\omega$ (namely, in a direction to increase the absolute value of the rolling angle $\theta$), the lateral overturning of the vehicle is promoted by the rolling angular acceleration $d\omega/dt$. This is because the absolute value of the rolling angular speed ω is gradually increased by the rolling angular acceleration dω/dt, and as a result, the absolute value of the rolling angle θ is gradually increased, thereby bringing the vehicle into the lateral overturning.

Therefore, the rolling angular speed ω output by the rolling angular speed sensor 16 is differentiated to calculate a rolling angular acceleration dω/dt. When the rolling angular acceleration dω/dt acts in a direction to promote the lateral overturning of the vehicle, the threshold value lines S, S are moved in the direction toward the origin, as shown by the arrows A in FIG. 6. As a result, it is made much more likely that the hysteresis line for the rolling angle θ and the rolling angular speed ω will traverse the threshold value lines S, S for any random value on the hysteresis line, and thus, it is possible to more accurately carry out the determination of a possibility of lateral overturning with the lateral acceleration Gy of the vehicle taken into consideration.

On the other hand, when the calculated rolling angular acceleration dω/dt is in a direction to inhibit the lateral overturning of the vehicle, the threshold value lines S, S are moved in the direction away from the origin, as shown by the arrows B in FIG. 6, thereby making it much less likely that the hysteresis line will traverse the threshold value lines S, S for any random value on the hysteresis line. Thus, it is possible to more accurately carry out the determination of a possibility of lateral overturning with the rolling angular acceleration dω/dt of the vehicle taken into consideration. In any of these cases, the amount by which the hysteresis line is moved is determined depending on the magnitude of the detected rolling angular acceleration dω/dt.

The above-described operation will be further described with reference to FIGS. 13 and 14.

Figure 14:
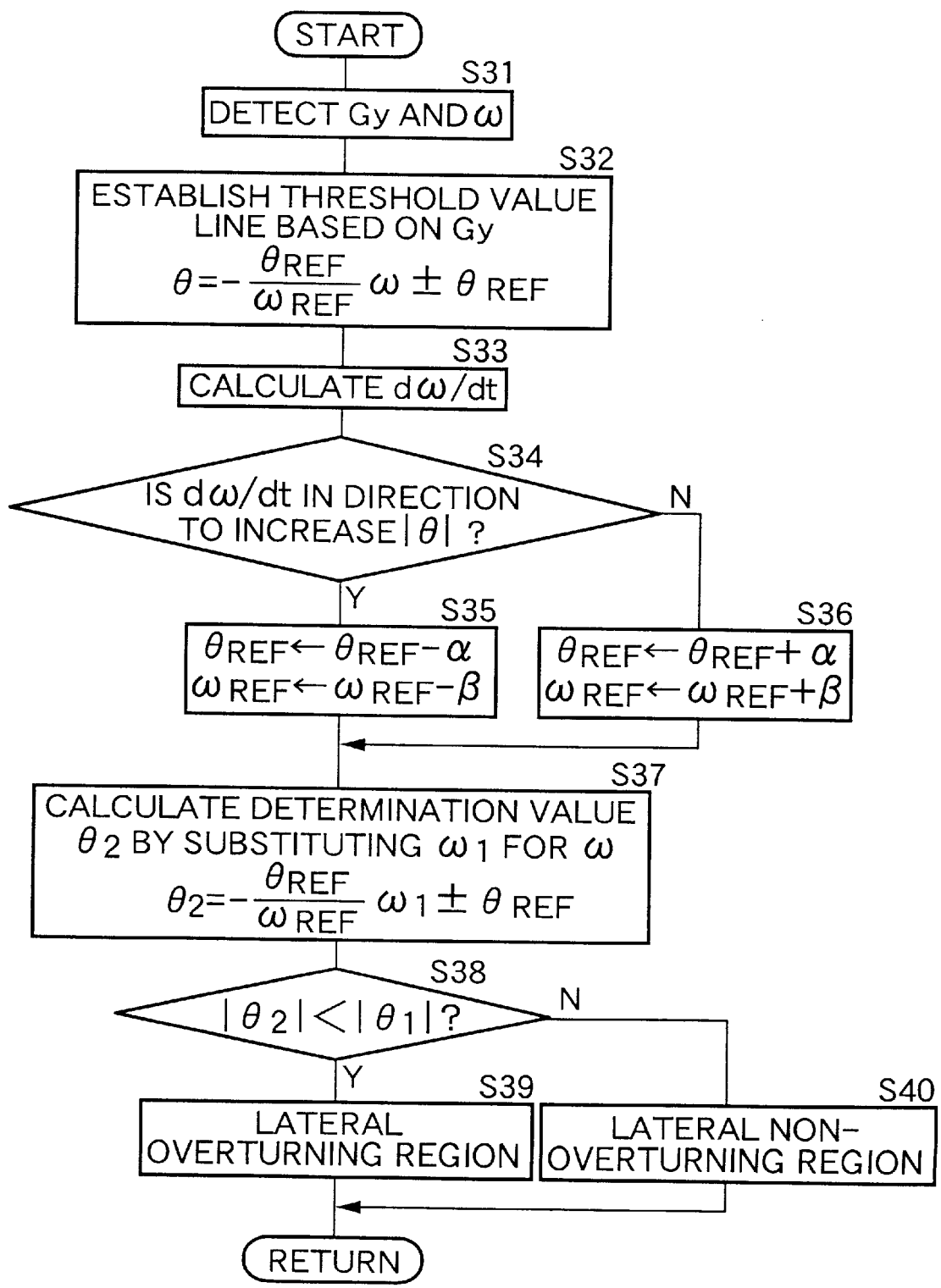

A flow of control operation according to the fourth embodiment is shown in FIG. 14. First, a lateral acceleration Gy and a rolling angular speed ω are read at Step S31, and threshold value lines S, S on the map are established in accordance with the lateral acceleration Gy at Step S32. The threshold value lines S, S are determined, if a critical rolling angle $\theta_{CRT}$, which is an intercept on the axis of ordinates of the map, and a critical rolling angular speed $\omega_{CRT}$, which is an intercept on the axis of abscissas, are determined. In the present embodiment, the threshold value lines S, S are determined, so that when the lateral overturning of the vehicle is promoted due to the lateral acceleration Gy, both of the critical rolling angle $\theta_{CRT}$ and the critical rolling angular speed $\omega_{CRT}$ are decreased, whereby the threshold value lines S, S are moved toward the origin.

If the critical rolling angle $\theta_{CRT}$ and the critical rolling angular speed $\omega_{CRT}$ are determined, an equation for the threshold value lines S, S is given as follows (see FIG. 3):

$$\theta = -(\theta_{CRT}/\omega_{CRT})\omega \pm \theta_{CRT}$$

At subsequent Step S33, the rolling angular speed ω is differentiated to calculate a rolling angular acceleration dω/dt. If the rolling angular acceleration dω/dt is in a direction to increase the absolute value of the rolling angle θ at Step S34, it is determined that the lateral overturning of the vehicle is promoted by the rolling angular acceleration dω/dt. At Step S35, the threshold value lines S, S determined at Step S32 are moved in the direction toward the origin. More specifically, the critical rolling angle $\theta_{CRT}$ is decreased by α to determine a new critical rolling angle $\theta_{CRT}$, and the critical rolling angular speed $\omega_{CRT}$ is decreased by β to determine a new critical rolling angular speed $\omega_{CRT}$, thereby determining new threshold value lines S, S.

On the other hand, if the rolling angular acceleration dω/dt is in a direction to decrease the absolute value of the rolling angle θ at Step S34, it is determined that the lateral overturning of the vehicle is inhibited by the rolling angular acceleration dω/dt. At Step S36, the threshold value lines S, S determined at Step S32 are moved in the direction away from the origin. More specifically, the critical rolling angle $\theta_{CRT}$ is increased by α to determine a new critical rolling angle $\theta_{CRT}$, and the critical rolling angular speed $\omega_{CRT}$ is increased by β to determine a new critical rolling angular speed $\omega_{CRT}$, thereby determining new threshold value lines S, S.

Subsequently, it is determined whether a coordinate point P provided by a current rolling angle $\theta_1$ and a current rolling angular speed $\omega_1$ is in the lateral overturning region or the lateral non-overturning region. More specifically, at Step S37, a current value of rolling angular speed $\omega_1$ is substituted for ω in the equation for the threshold value line S to calculate a determination value $\theta_2$. The determining value $\theta_2$ is a θ coordinate point which is a point Q of intersection between a straight line $\omega = \omega_1$ and the threshold value line S. At subsequent Step S38, the determination value $\theta_2$ is compared with the current rolling angle $\theta_1$. If a relation, $|\theta_2| < |\theta_1|$ is established, it is determined at Step S39 that the coordinate point P provided by the current rolling angle $\theta_1$ and the current rolling angular speed $\omega_1$ is in the lateral overturning region. If the relation, $|\theta_2| < |\theta_1|$ is not established, it is determined at Step S40 that the coordinate point P provided by the current rolling angle $\theta_1$ and the current rolling angular speed $\omega_1$ is in the lateral non-overturning region. Again, a case ($|\theta_2| < |\theta_1|$) where the coordinate point P is in the lateral overturning region is shown in FIG. 6.

A fifth embodiment of the present invention will now be described with reference to FIGS. 15 and 16.

Figure 15:
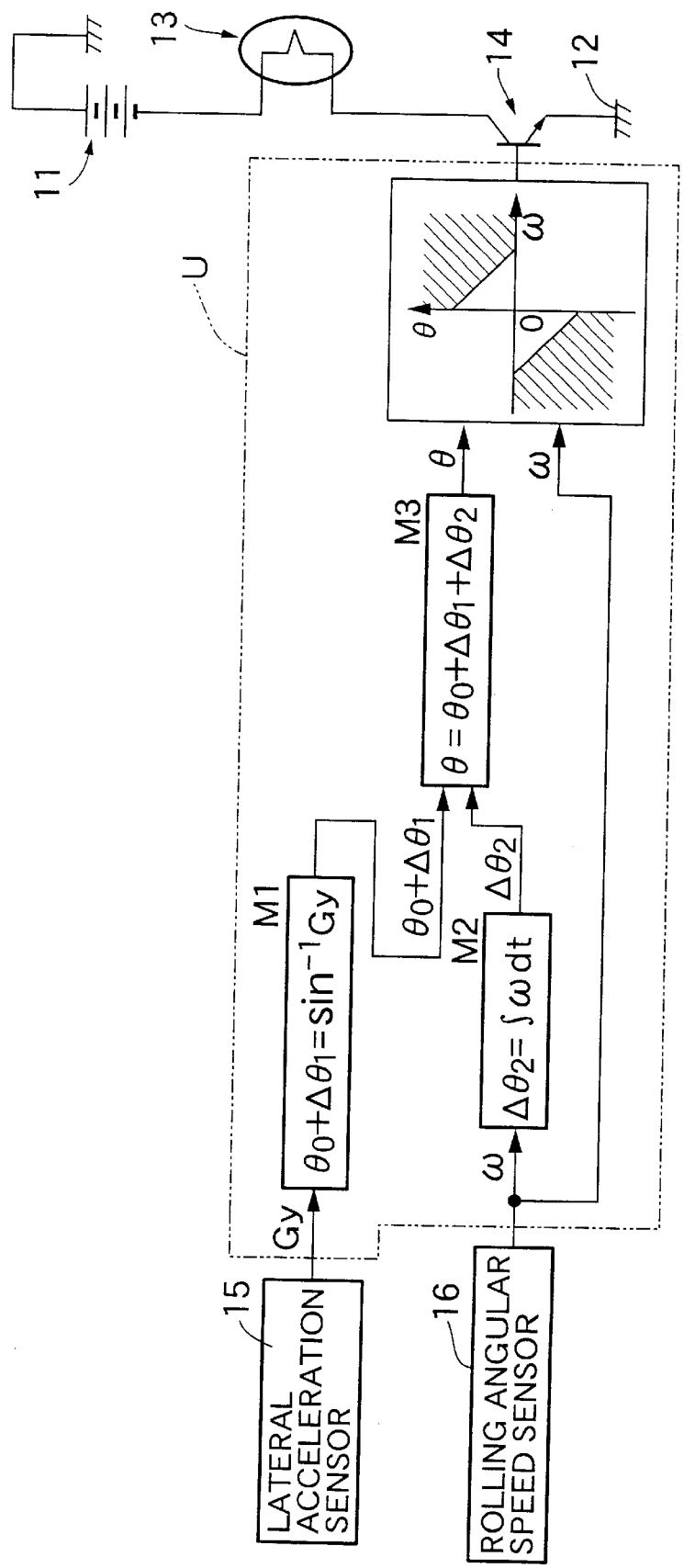
Figure 16:
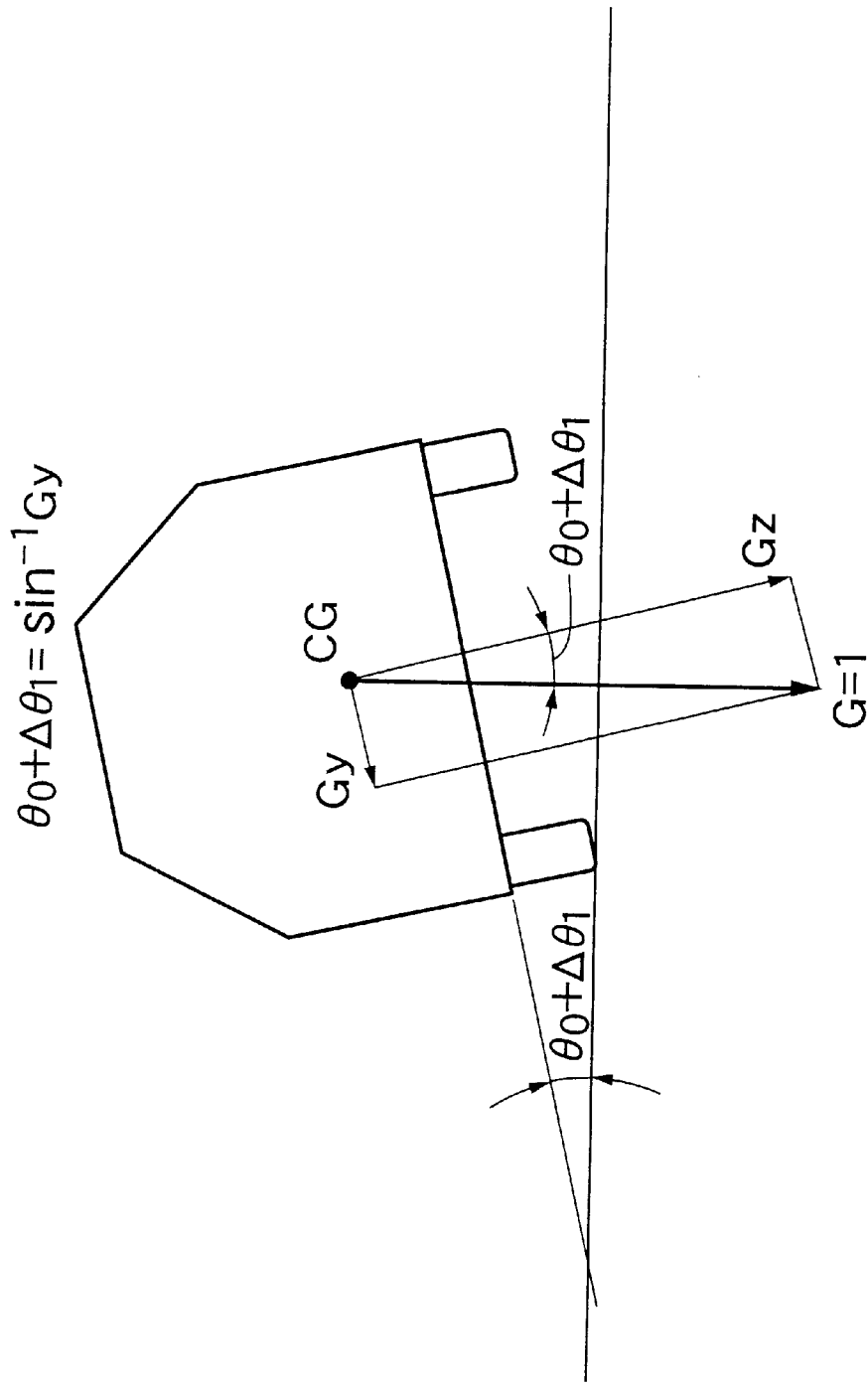

As shown in FIG. 15, a lateral acceleration sensor 15 fixed to a vehicle body detects a component of a gravitational acceleration G in a lateral direction of the vehicle body as a lateral acceleration Gy. A first detecting means M1 provided in an electronic control unit U calculates a sum of an initial value $\theta_0$ of a rolling angle θ of a vehicle and a first amount $\Delta\theta_1$ of change in the rolling angle θ according to $\theta_0 + \Delta\theta_1 = \sin^{-1} Gy$ (see FIG. 16). In this case, the initial value $\theta_0$ corresponds to a rolling angle at a time point when the ignition switch is turned on, and the first amount $\Delta\theta_1$ of change corresponds to an amount of change in rolling angle during traveling of the vehicle.

On the other hand, a rolling angular speed ω output by a rolling angular speed sensor 16 is input to a second detecting means M2, where a second amount $\Delta\theta_2$ of change in rolling angle is calculated as an integration value $\int \omega dt$ of rolling angular speed ω from the time point when the ignition switch has been turned on. An adding means M3 calculates a rolling angle θ of the vehicle by adding a value $\theta_0 + \Delta\theta_1$ which is an output from the first detecting means M1 and a value $\Delta\theta_2$ which is an output from the second detecting means M2.

A hysteresis line which is a locus of a coordinate point provided by the rolling angle θ of the vehicle calculated in the above manner and the rolling angular speed ω output by the rolling angular speed sensor 16, is described on the map shown in FIG. 3. When the hysteresis line traverses threshold value lines S, S from a side nearer to the origin to a side farther from the origin, it is determined that there is a possibility that the vehicle is overturning laterally or sideways, and the ignition transistor 14 is turned on to activate the inflator for the inflatable curtain.

The first detecting means M1 for detecting the rolling angle $\theta_0 + \Delta\theta_1$ based on the component of the gravitational acceleration G in the lateral direction of the vehicle body is capable of detecting the rolling angle $\theta_0+\Delta\theta_1$ in a steady state (in a state in which the rolling angle is not varied), and is excellent in detecting accuracy, particularly, in a low-frequency range. However, the first detecting means M1 suffers from a disadvantage that it is influenced by a lateral acceleration produced with the turning movement of the vehicle, and also is incapable of detecting a rolling angle during free dropping of the vehicle. On the other hand, the second detecting means M2 for detecting the amount $\Delta\theta_2$ of change in rolling angle based on the integration value of the rolling angular speed ω of the vehicle is capable of following the rapid variation in rolling angle and is excellent in detecting accuracy in a high-frequency range. However, the second detecting means M2 suffers from a disadvantage that it is liable to be influenced by a drift and moreover, is incapable of detecting the amount $\Delta\theta_2$ in a steady state in which the rolling angular speed ω is not varied.

In the present embodiment, however, the output from the first detecting means M1 and the output from the second detecting means M2 are added to each other in the adding means M3 to calculate the rolling angle θ of the vehicle and hence, the generation of an error can be suppressed to the minimum to carry out an accurate detection of the rolling angle θ. The reason is as follows: If the rolling angle θ is detected using only one of the first amount $\Delta\theta_1$ of change in rolling angle output by the first detecting means M1 and the second amount $\Delta\theta_2$ of change in rolling angle output by the second detecting means M2, there is a possibility that an influence of an error generated in such one amount may be exerted, as it is, to a final rolling angle θ, resulting in a remarkably reduced accuracy of detection of the rolling angle θ. To the contrary, in the present embodiment, even if an error is generated in one of the first amount $\Delta\theta_1$ of change in rolling angle and the second amount $\Delta\theta_2$ of change in rolling angle, an influence of such error is alleviated by the correct outputting of the other amount and hence, as a whole, the accuracy of detection of the rolling angle θ can be enhanced.

Figure 17:
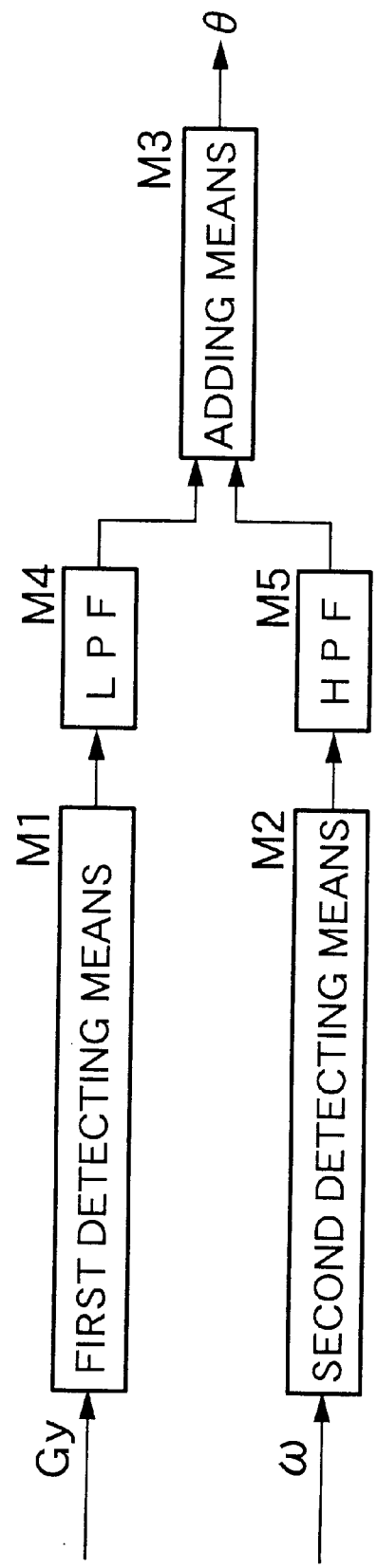
Figure 18:
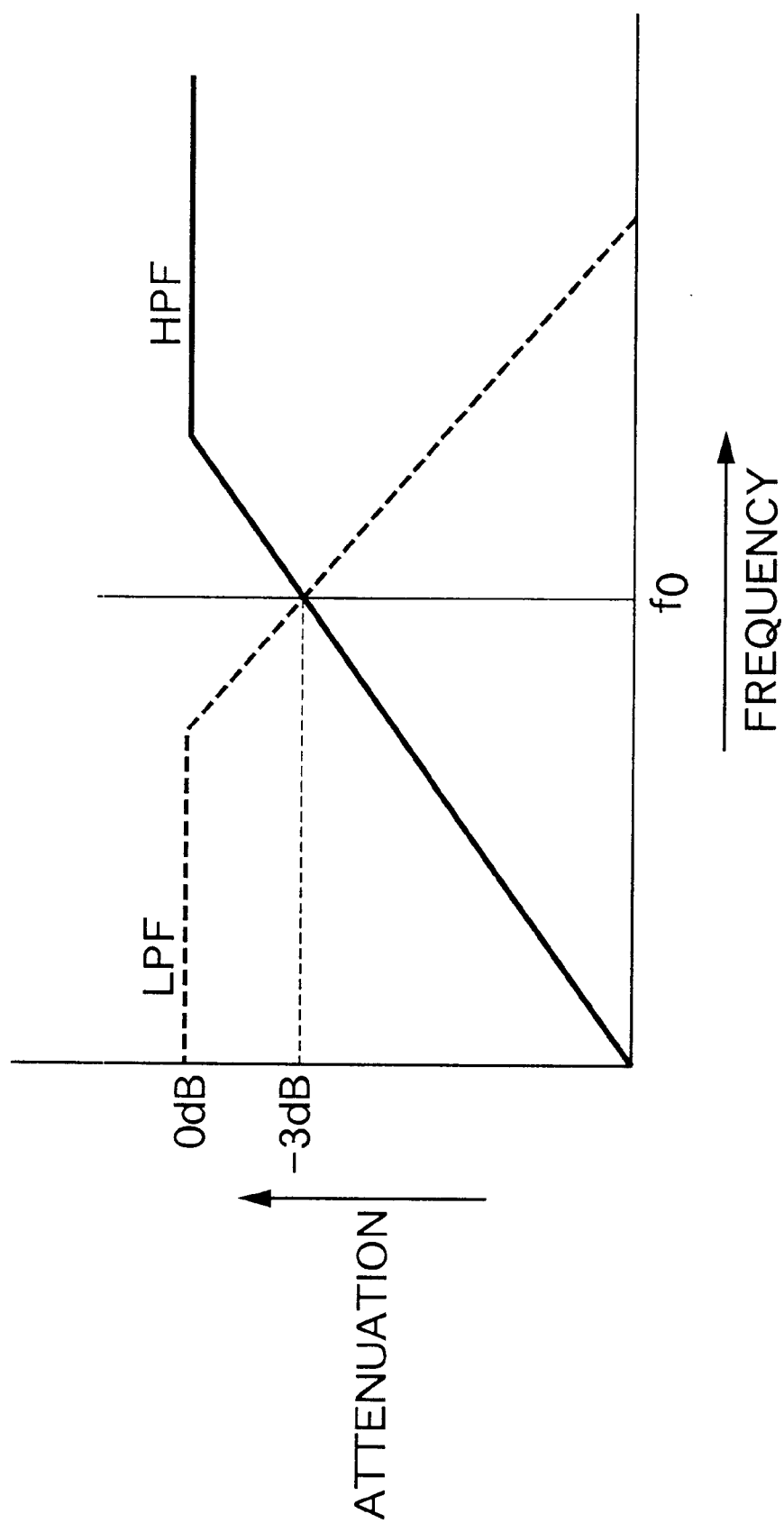

In a sixth embodiment shown in FIGS. 17 and 18, a value $\theta_0+\Delta\theta_1$ which is an output from the first detecting means M1 is passed through a low-pass filter M4, and an output in a frequency range higher than a predetermined frequency $f_0$ (for example, in a range of 0.1 to 0.01 Hz) is damped before being input to the adding means M3. A value $\Delta\theta_2$ which is an output from the second detecting means M2 is passed through a high-pass filter M5, and an output in a frequency range lower than the predetermined frequency $f_0$ is damped before being input to the adding means M3. Thus, the characteristic of the first detecting means M1 excellent in detection accuracy in the low-frequency range and the characteristic of the second detecting means M2 excellent in detection accuracy in the high-frequency range can be reconciled effectively and, as a whole, the accuracy of detection of the rolling angle θ can be further enhanced.

Figure 19:
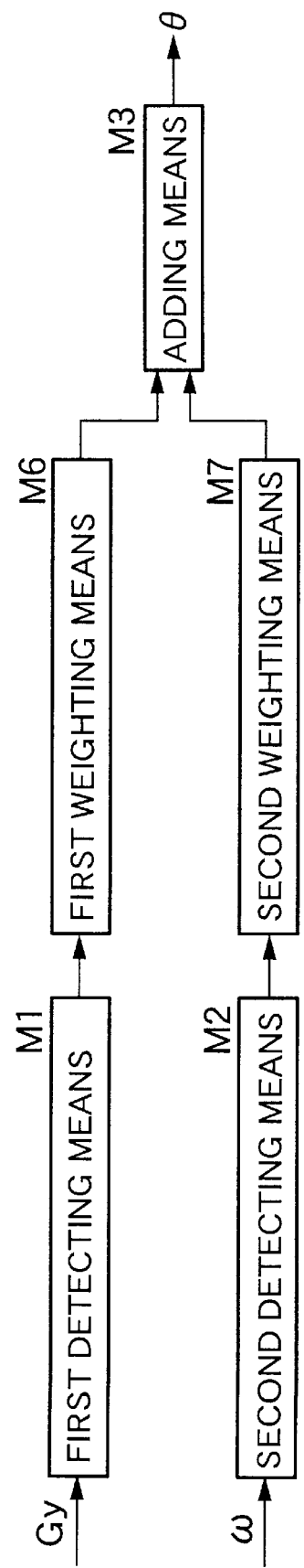
FIG. 19 is a schematic diagram or graph showing a rolling angle detecting system according to a seventh embodiment of the present invention.

In a seventh embodiment shown in FIG. 19, a value $\theta_0+\Delta\theta_1$ which is an output from the first detecting means M1 is passed through a first weighting means M6, and a value resulting from multiplication of the value $\theta_0+\Delta\theta_1$ by a first weighting factor increased with a decrease in frequency is then input to the adding means M3. An output from the second detecting means M2 is passed through a second weighting means M7 and a value resulting from multiplication of the output by a second weighting factor increased with an increase in frequency is then input to the adding means M3. Thus, as in the sixth embodiment, the characteristic of the first detecting means M1 excellent in detection accuracy in the low-frequency range and the characteristic of the second detecting means M2 excellent in detection accuracy in the high-frequency range can be reconciled effectively, and as a whole, the accuracy of detection of the rolling angle θ can be further enhanced.

Figure 20:
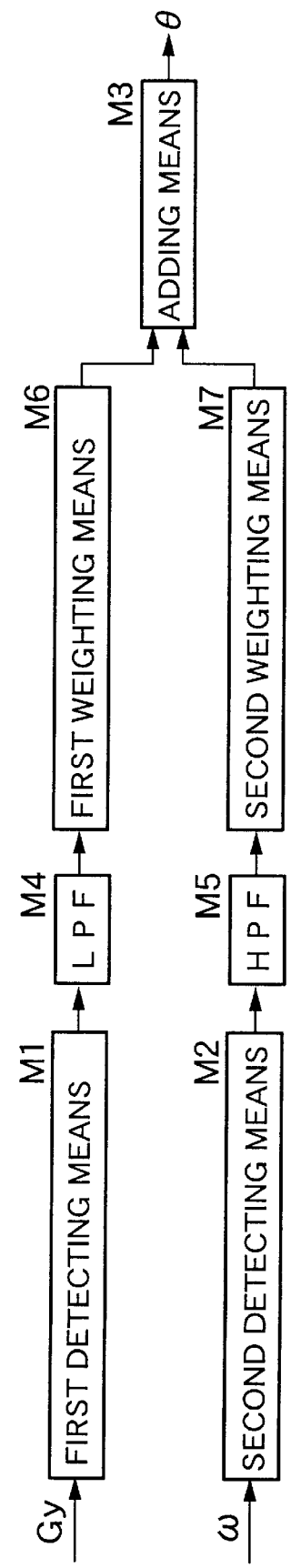
FIG. 20 is schematic diagram or graph showing a rolling angle detecting system according to an eighth embodiment of the present invention.

An eighth embodiment shown in FIG. 20 corresponds to a combination of the sixth and seventh embodiments with each other. In the eighth embodiment, a value $\theta_0+\Delta\theta_1$ which is an output from the first detecting means M1 is passed through the low-pass filter M4 and the first weighting means M6 before being input to the adding means M3, and an output from the second detecting means M2 is passed through the high-pass filter M5 and the second weighting means M7 before being input to the adding means M3. Thus, the accuracy of detection of the rolling angle θ can be further enhanced.

Although the embodiments of the present invention have been described in detail above, it will be understood that the present invention is not limited to the above-described embodiments, and various modifications may be made without departing from the spirit and scope of the invention defined in claims.

For example, the determination that there is a possibility of lateral overturning of the vehicle is utilized in the control of the deployment of the inflatable curtain in the embodiments above, but may be utilized in another application such as the control of the deployment of a side air bag, the control of the deployment of a housed roll bar and the like. In addition, the initial value $\theta_0$ of the rolling angle θ of the vehicle may be calculated according to an equation, $\theta_0=\cos^{-1} Gz$ using a vertical acceleration Gz which is a component of a gravitational acceleration G in a vertical direction of the vehicle body.

What is claimed is:

1. A process for determining the lateral overturning of a vehicle, comprising the steps of: establishing a threshold value line on a two-dimensional map made using a rolling angle and a rolling angular speed of the vehicle as parameters;

plotting a hysteresis line for an actual rolling angle and an actual rolling angular speed on said two-dimensional map; and determining that there is a possibility that the vehicle is overturning laterally or sideways when the hysteresis line traverses the threshold value line from a side nearer to an origin of the map to a side farther from the origin;

said threshold value line being changed depending on at least one of a lateral acceleration of the vehicle, a lateral speed of the vehicle, a direction of change in steering angle of the vehicle, and a rolling angular acceleration of the vehicle.

2. A process for determining the lateral overturning of a vehicle according to claim 1, wherein the threshold value line is changed depending on the lateral acceleration of the vehicle, and when said lateral acceleration is in a direction to increase the absolute value of the rolling angle, said threshold value line is moved toward the origin, and when said lateral acceleration is in a direction to decrease the absolute value of the rolling angle of the vehicle, said threshold value line is moved away from the origin.

3. A process for determining the lateral overturning of a vehicle according to claim 1, wherein the threshold value line is changed depending on the lateral speed of the vehicle, and when said lateral speed is in a direction to increase the absolute value of the rolling angle, said threshold value line is moved toward the origin, and when said lateral speed is in a direction to decrease the absolute value of the rolling angle, the threshold value line is moved away from the origin.

4. A process for determining the lateral overturning of a vehicle according to claim 1, wherein the threshold value line is changed depending on the direction of change in steering angle of the vehicle, and when said direction of change in steering angle is a direction to increase the absolute value of the rolling angle, said threshold value line is moved toward the origin, and when said direction of change in steering angle is a direction to decrease the absolute value of the rolling angle, said threshold value line is moved away from the origin.

5. A process for determining the lateral overturning of a vehicle according to claim 1, wherein the threshold value line is changed depending on the rolling angular acceleration of the vehicle, and when said rolling angular acceleration is in a direction to increase the absolute value of the rolling angle, said threshold value line is moved toward the origin, and when said rolling angular acceleration is in a direction to decrease the absolute value of the rolling angle, said threshold value line is moved away from the origin.

6. A process for determining lateral overturning of a vehicle according to claim 1, wherein said two-dimensional map includes four quadrants in which positive and negative signs of the rolling angle and positive and negative signs of the rolling angular speed are combined with one another, whereby when said hysteresis line extends astride at least three of said quadrants and a distance of said hysteresis line from the origin is increased, said threshold value line is moved toward the origin.

7. A process for determining the lateral overturning of a vehicle, comprising the steps of: establishing a threshold value line on a two-dimensional map made using a rolling angle and a rolling angular speed of the vehicle as parameters;

plotting a hysteresis line for an actual rolling angle and an actual rolling angular speed on said two-dimensional map; and determining that there is a possibility that the vehicle is overturning laterally or sideways when the hysteresis line traverses the threshold value line from a side nearer to an origin of said map to a side farther from said origin;

said two-dimensional map including four quadrants in which positive and negative signs of the rolling angle and positive and negative signs of the rolling angular speed are combined with one another, whereby when said hysteresis line extends astride at least three of said quadrants and a distance of said hysteresis line from the origin is increased, said threshold value line is moved toward the origin.

8. A system for determining the lateral overturning of a vehicle, comprising: means for establishing a threshold value line on a two-dimensional map made using a rolling angle and a rolling angular speed of the vehicle as parameters;

means for plotting a hysteresis line for an actual rolling angle and an actual rolling angular speed on said two-dimensional map;

means for determining that there is a possibility that the vehicle is overturning laterally or sideways when the hysteresis line traverses the threshold value line from a side nearer to an origin of the map to a side farther from the origin; and changing means for changing said threshold value line depending on at least one of a lateral acceleration of the vehicle, a lateral speed of the vehicle, a direction of change in steering angle of the vehicle, and a rolling angular acceleration of the vehicle.

9. A system for determining the lateral overturning of a vehicle according to claim 8, wherein the threshold value line is changed by said changing means depending on the lateral acceleration of the vehicle, and when said lateral acceleration is in a direction to increase the absolute value of the rolling angle, said threshold value line is moved toward the origin, and when said lateral acceleration is in a direction to decrease the absolute value of the rolling angle of the vehicle, said threshold value line is moved away from the origin.

10. A system for determining the lateral overturning of a vehicle according to claim 8, wherein the threshold value line is changed by changing means depending on the lateral speed of the vehicle, and when said lateral acceleration is in a direction to increase the absolute value of the rolling angle, said threshold value line is moved toward the origin, and when said lateral speed is in a direction to decrease the absolute value of the rolling angle, the threshold value line is moved away from the origin.

11. A system for determining the lateral overturning of a vehicle according to claim 8, wherein the threshold value line is changed by said changing means depending on the direction of change in steering angle of the vehicle, and when said direction of change in steering angle is a direction to increase the absolute value of the rolling angle, said threshold value line is moved toward the origin, and when said direction of change in steering angle is a direction to decrease the absolute value of the rolling angle, said threshold value line is moved away from the origin.

12. A system for determining the lateral overturning of a vehicle according to claim 8, wherein the threshold value line is changed by said changing means depending on the rolling angular acceleration of the vehicle, and when said rolling angular acceleration is in a direction to increase the absolute value of the rolling angle, said threshold value line is moved toward the origin, and when said rolling angular acceleration is in a direction to decrease the absolute value of the rolling angle, said threshold value line is moved away from the origin.

13. A system for determining lateral overturning of a vehicle according to claim 8, wherein said two-dimensional map includes four quadrants in which positive and negative signs of the rolling angle and positive and negative signs of the rolling angular speed are combined with one another, whereby when said hysteresis line extends astride at least three of said quadrants and a distance of said hysteresis line from the origin is increased, said threshold value line is moved by said changing means toward the origin.

* * * * *

UNITED STATES PATENT AND TRADEMARK OFFICE
CERTIFICATE OF CORRECTION

PATENT NO. : 6,438,463 B1
DATED : August 20, 2002
INVENTOR(S) : Shigeo Tobaru, Hiroyuki Maeda and Osamu Takahata It is certified that error appears in the above-identified patent and that said Letters Patent is hereby corrected as shown below:

Column 3,
Line 17, change "that-there" to -- that there --.

Column 10,
Line 22, change "acceleration-Gy" to -- acceleration Gy --.

Column 11,
Line 8, change "($\omega_{CRT}$" to -- $\omega_{CRT}$ --.

Column 14,
Line 32, change "WCRT" to -- $\omega_{CRT}$ --.

Signed and Sealed this

Eighth Day of April, 2003

JAMES E. ROGAN
*Director of the United States Patent and Trademark Office*